United States Patent

(12) United States Patent
Miyazawa et al.

(10) Patent No.: US 12,733,661 B2
(45) Date of Patent: Sep. 15, 2026

(54) INKJET INK AND TABLET PRINTED MATTER

(71) Applicant: TOPPAN HOLDINGS INC., Tokyo (JP)

(72) Inventors: Yasuhisa Miyazawa, Tokyo (JP); Seiya Koseki, Tokyo (JP); Yuichi Hoshino, Tokyo (JP); Masatoshi Saito, Tokyo (JP); Risa Hashimoto, Tokyo (JP); Hiromitsu Uchiyama, Tokyo (JP)

(73) Assignee: TOPPAN HOLDINGS INC., Tokyo (JP)

( * ) Notice: Subject to any disclaimer, the term of this patent is extended or adjusted under 35 U.S.C. 154(b) by 170 days.

(21) Appl. No.: 18/621,932

(22) Filed: Mar. 29, 2024

(65) Prior Publication Data

US 2024/0334954 A1 Oct. 10, 2024

(30) Foreign Application Priority Data

Apr. 7, 2023 (JP) ................................ 2023-063095

(51) Int. Cl.

| | |
|---|---|
| ***B32B 3/10*** | (2006.01) |
| ***A23L 5/42*** | (2016.01) |
| ***A23P 20/20*** | (2016.01) |
| *A23P 20/25* | (2016.01) |

(52) U.S. Cl.

CPC ................ *A23L 5/42* (2016.08); *A23P 20/20* (2016.08); *A23P 2020/253* (2016.08)

(58) Field of Classification Search

None

See application file for complete search history.

(56) References Cited

FOREIGN PATENT DOCUMENTS

| | | | | |
|---|---|---|---|---|
| EP | 3928987 A1 | | 12/2021 | |
| JP | 2006-169301 A | | 6/2006 | |
| JP | 6389506 B2 | | 9/2018 | |
| JP | 2020-022645 A | | 2/2020 | |
| JP | 6888728 B1 | * | 6/2021 | ............. B41J 3/407 |
| JP | 7127711 B1 | | 8/2022 | |
| WO | WO 2024/150770 A1 | | 7/2024 | |

OTHER PUBLICATIONS

Machine translation of JP-6888728-B1 (Year: 2021).*

Extended European Search Report dated Sep. 30, 2024, for European Patent Application No. 24168435.6, 6 pages.

* cited by examiner

*Primary Examiner* — Christopher M Polley

(74) *Attorney, Agent, or Firm* — SQUIRE PATTON BOGGS (US) LLP

(57) ABSTRACT

This invention aims to provide an inkjet ink capable of sufficiently suppressing the photodiscoloration and/or photofading of printed images and maintaining the lightfastness not only when the inkjet ink is stored and used in a low humidity environment (about 20% RH) but when the inkjet ink is stored and used in a normal humidity environment (about 50% RH), and a tablet (tablet printed matter) including printed parts printed with the inkjet ink.

An inkjet ink according to this embodiment contains: Blue No. 1 as a food dye in the range of 0.1 mass % or more and 2.5 mass % or less based on the total mass of the inkjet ink; and reduced isomaltulose as a fixing agent in the range of 5.7 times or more and 16.2 times or less the mass of the Blue No. 1.

20 Claims, 5 Drawing Sheets

INKJET INK AND TABLET PRINTED MATTER

TECHNICAL FIELD

The present invention relates to an inkjet ink and tablet printed matter.

BACKGROUND ART

Some inkjet printing inks (hereinafter also simply referred to as an "inkjet ink") are edible with use of food dyes, such as tar pigments, for example, as colorants.

Conventionally, some inkjet inks cause discoloration in which the color tone (hue) of the colorants has changed in printed characters, images, and the like due to the deterioration of the colorants or cause fading due to desaturation or the like of the colorants. For example, when the inkjet inks are insufficient in lightfastness, the colorants are affected by light and decompose (undergo photolysis) to cause discoloration and/or fading (photodiscoloration and/or photofading). Such discoloration and/or fading is perceived as a decrease in visibility in printed characters, images, and the like (hereinafter collectively referred to as "printed images").

To suppress the discoloration and/or fading of the printed images, technologies are being developed, and various methods for suppressing the discoloration and/or fading have been proposed (e.g., PTL 1).

When characters or images are printed on tablets and the like, inkjet inks and the like containing food dyes having coloring properties are sometimes used to increase the visibility. Some food dyes contained in the inks and the like cause significant discoloration and/or fading due to light.

With respect to Blue No. 1 among the food dyes contained in the inkjet inks and the like, the lightfastness is sometimes improved by compounding reduced isomaltulose in the inks.

However, some of the inkjet inks and the like containing Blue No. 1 and reduced isomaltulose are susceptible to the influence of the usage environment or the storage environment (particularly the influence of humidity) of the inks and the like. For example, some of the inkjet inks and the like containing Blue No. 1 and reduced isomaltulose decrease in lightfastness when the inks and the like are stored in environments of normal humidity to high humidity or when the inks and the like are used in environments of normal humidity to high humidity.

Therefore, some of the inkjet inks and the like containing Blue No. 1 and reduced isomaltulose are difficult to maintain sufficient lightfastness unless stored in a low humidity environment or unless used in a low humidity environment.

CITATION LIST

Patent Literature

PTL 1: JP 6389506 B

SUMMARY OF INVENTION

Technical Problem

The present invention has been made in view of the above-described respects, and aims to provide an inkjet ink capable of sufficiently suppressing the photodiscoloration and/or photofading of printed images and maintaining the lightfastness not only when the inkjet ink is stored and used in a normal temperature and low humidity environment (about 25° C./20% RH) but when the inkjet ink is stored and used in a normal temperature and normal humidity environment (about 25° C./50% RH), and a tablet (tablet printed matter) including printed parts printed with the inkjet ink. Hereinafter, the humidity expressions without any description of temperatures are expressed as the relative humidity at normal temperature of 25° C. More specifically, a "low humidity environment (about 20% RH)" described later means a normal temperature and low humidity environment (about 25° C./20% RH), and a "normal humidity environment (about 50% RH)" described later means a normal temperature and normal humidity environment (about 25° C./50% RH).

Thus, this application aims to provide an inkjet ink that is made to cope with also the influence of humidity, which has not been conventionally considered so much, and a tablet (tablet printed matter) including printed parts printed with the inkjet ink.

Solution to Problem

To achieve the above-described aim, an inkjet ink according to one aspect of the present invention contains: Blue No. 1 as a food dye in the range of 0.1 mass % or more and 2.5 mass % or less based on the total mass of the inkjet ink; and reduced isomaltulose as a fixing agent in the range of 5.7 times or more and 16.2 times or less the mass of the Blue No. 1.

Further, to achieve the above-described aim, a tablet (tablet printed matter) according to one aspect of the present invention includes printed parts printed using the above-described inkjet ink.

Advantageous Effects of Invention

One aspect of the present invention can sufficiently suppress the photodiscoloration and/or photofading of the printed images and maintain the lightfastness of the inkjet ink not only when the inkjet ink is stored and used in a low humidity environment (about 20% RH) but when the inkjet ink is stored and used in a normal humidity environment (about 50% RH). More specifically, one aspect of the present invention can provide an inkjet ink that is made to cope with also the influence of humidity, which has not been conventionally considered so much, and a tablet (tablet printed matter) including printed parts printed with the inkjet ink.

DESCRIPTION OF EMBODIMENTS

An inkjet ink according to an embodiment of the present invention (hereinafter referred to as "this embodiment")

relates to an inkjet ink capable of sufficiently suppressing the photodiscoloration and/or photofading of printed images and the like printed on the surfaces of medicine tablets by an inkjet printing method and maintaining the lightfastness, for example, not only when the inkjet ink is stored and used in a low humidity environment (about 20% RH) but when the inkjet ink is stored and used in a normal humidity environment (about 50% RH). Hereinafter, the compositions of the inkjet ink and the tablet (tablet printed matter) including printed parts printed with the inkjet ink according to the embodiment of the present invention are described in detail.

[Composition of Inkjet Ink]

The inkjet ink according to this embodiment is an edible inkjet ink and contains Food Blue No. 1 (hereinafter, simply referred to as "Blue No. 1") as a food dye (food pigment). The inkjet ink according to this embodiment further contains, as a fixing agent for fixing the ink to the surface of a printing target (e.g., solid formulation), reduced isomaltulose. Further, the inkjet ink according to this embodiment contains the Blue No. 1 in the range of 0.1 mass % or more and 2.5 mass % or less based on the total mass of the inkjet ink. Further, the inkjet ink according to this embodiment contains the reduced isomaltulose in the range of 5.7 times or more and 16.2 times or less the mass of the Blue No. 1. With this composition, even when the inkjet ink is stored and used in a normal humidity environment (about 50% RH), the photodiscoloration and/or photofading of the printed images can be sufficiently suppressed and the lightfastness of the inkjet ink can be maintained. Hereinafter, this respect is described with reference to FIGS. 1A to 1C.

Figure 1A:
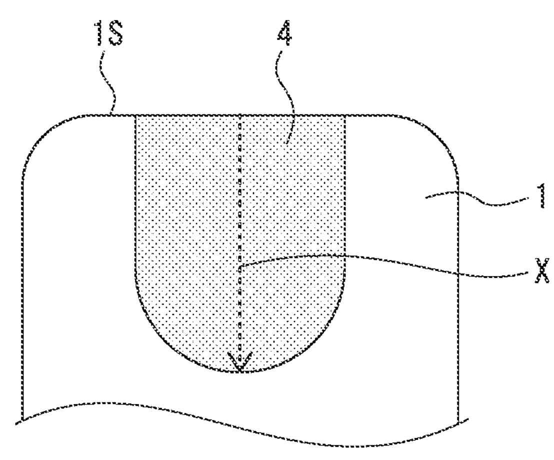
FIGS. 1A to 1C are conceptual views illustrating the permeability and the lightfastness of an inkjet ink in an embodiment of the present invention.
Figure 1B:
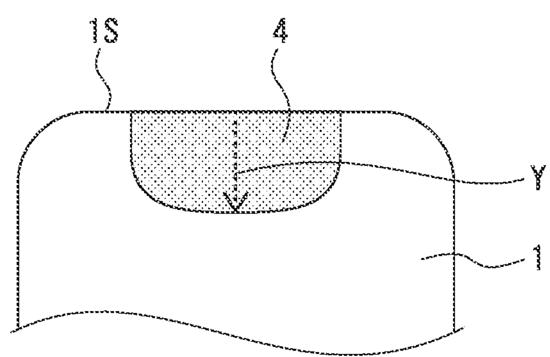
Figure 1C:
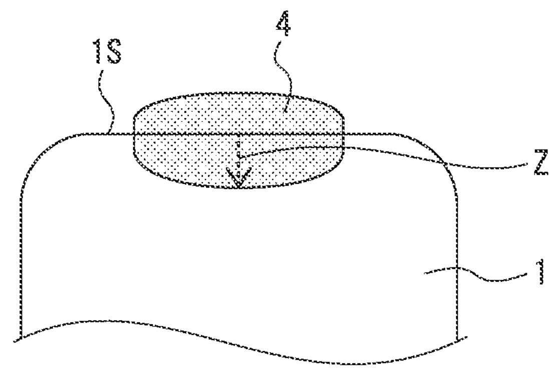

FIGS. 1A to 1C are conceptual views for explaining the relationship between the fixation and the lightfastness of the ink on the surface of the printing target (solid formulation). Herein, a tablet including a film-coated part having few voids, i.e., a film-coated (FC) tablet, is used as the solid formulation. The present invention is not limited thereto, and the printing target may also be an uncoated tablet or a capsule tablet.

FIGS. 1A to 1C are schematic cross-sectional views in the thickness direction of tablets (herein, film-coated tablets) after a certain period of time has passed from the printing of inkjet inks A to C having different compositions on the tablets. In this example, the inkjet ink A is an ink containing a specific dye 4 as a colorant and containing water as a solvent. As the specific dye 4, the Blue No. 1 can be exemplified.

The inkjet ink B is an ink obtained by adding a predetermined saccharide to the inkjet ink A. Herein, the saccharide added to the inkjet ink B is a saccharide (e.g., maltose) having relatively high solubility in water and not corresponding to the fixing agent in this embodiment. The inkjet ink C is an ink obtained by adding the reduced isomaltulose corresponding to the fixing agent to the inkjet ink A.

Specifically, FIG. 1A is a schematic cross-sectional view in the thickness direction of the tablet when a certain period of time (e.g., 140 hours) has passed from the printing of the inkjet ink A on a surface 1S of a substrate 1 of the tablet, the inkjet ink A containing the specific dye 4 as the colorant and containing water as the solvent. FIG. 1B is a schematic cross-sectional view in the thickness direction of the tablet when the certain period of time (e.g., 140 hours) has passed from the printing of the inkjet ink B on the surface 1S of the substrate 1 of the tablet. FIG. 1C is a schematic cross-sectional view in the thickness direction of the tablet when the certain period of time (e.g., 140 hours) has passed from the printing of the inkjet ink C on the surface 1S of the substrate 1 of the tablet.

First, the addition or non-addition of saccharides and the permeability of the dyes in the inkjet inks are described taking the inkjet inks A, B as examples.

Among various colorants used for the inkjet inks, tar pigments used as the food dye, for example, can cause discoloration and/or fading in letters, images, and the like printed on the surfaces of solid formulations or the like. For example, the Blue No. 1 among the tar pigments has caused discoloration and/or fading of the printed images due to permeation into the solid formulations with the lapse of time or photolysis. To address the problem, a method for suppressing the permeation of the dye into the solid formulations and suppressing the discoloration and/or fading of the printed images by adding saccharides to the inkjet inks is known.

As illustrated in FIG. 1A, when the inkjet ink A containing no saccharides is printed, the specific dye 4 permeates into the substrate 1 of the tablet after the lapse of the certain period of time from the printing. Herein, the depth of the permeation of the specific dye 4 in the inkjet ink A after the lapse of the certain period of time is defined as a permeation depth X (μm). In contrast thereto, when the inkjet ink B containing the saccharide is printed, a permeation depth Y (μm) of the inkjet ink B is smaller than the permeation depth X of the inkjet ink A (X>Y) after the lapse of the certain period of time from the printing as illustrated in FIG. 1B.

In the inkjet ink B, the addition of the predetermined saccharide increases the viscosity or the like of the ink, suppressing the permeation of the specific dye 4 into the substrate 1 of the tablet. Therefore, when the inkjet ink B is printed, the specific dye 4 remains in the vicinity of the surface 1S in the substrate 1 of the tablet even after the lapse of the certain period of time from the printing. More specifically, the inkjet ink containing the predetermined saccharide can suppress the discoloration and/or fading of the printed images due to the permeation of the dye (i.e., Blue No. 1) as compared with a case where no saccharides are added. Meanwhile, the inkjet ink B added with the predetermined saccharide cannot sufficiently suppress the discoloration and/or fading (photodiscoloration and/or photofading) of the printed images due to irradiation with light.

In contrast thereto, the inkjet ink according to this embodiment fixes the ink to the surface of the printing target to sufficiently suppress the photodiscoloration and/or photofading of the printed images and enhance the lightfastness by selecting the type or the compounding amount of the fixing agent and the solvent to be added. The present inventors have found that the fixing of the ink onto the surface of the printing target (e.g., tablet) is effective for suppressing the photodiscoloration and/or photofading of the printed images. In this example, the ink is fixed onto the surface 1S of the tablet to thereby fix the specific dye 4 onto the surface 1S, and, as a result, the specific dye 4 can be allowed to remain at a high density on the surface 1S.

A high density of the specific dye 4 on the surface 1S of the substrate 1 of the tablet reduces the proportion of the colorant causing the photodiscoloration and/or photofading due to the photolysis of the specific dye 4 on the surface 1S, for example. More specifically, even when the photodiscoloration and/or photofading occurs in a part of the specific dye 4, the influence is limited, and the decrease in visibility (readability) of the printed images is suppressed. Thus, the visibility of the whole printed images can be maintained, and, as a result, the photodiscoloration and/or photofading of the printed images can be sufficiently suppressed. Therefore, the lightfastness of the inkjet ink can be enhanced. Then, the present inventors have found that reduced isomaltulose functions as the fixing agent fixing the ink containing the Blue No. 1 as the colorant to the surface of the printing target not only when the inkjet ink is stored and used in a low humidity environment (about 20% RH) but when the inkjet ink is stored and used in a normal humidity environment (about 50% RH).

Specifically, the inkjet ink according to this embodiment contains the Blue No. 1 as the food dye, which is the colorant, and the reduced isomaltulose as the fixing agent. With this composition, even when the inkjet ink is stored and used in a normal humidity environment (about 50% RH), the ink containing the specific tar pigment (Blue No. 1 in this example) used as the colorant can be fixed to the surface of the printing target, and the above-described specific tar pigment can be allowed to remain at a high density on the surface. Thus, the inkjet ink according to this embodiment can sufficiently suppress the photodiscoloration and/or photofading of the printed images and enhance the lightfastness.

As illustrated in FIG. 1C, when the inkjet ink C corresponding to the inkjet ink according to this embodiment is printed on the surface 1S of the substrate 1 of the tablet, the specific dye 4 (herein, Blue No. 1) in the ink is fixed to the surface 1S. Specifically, when the printing inkjet ink C is printed, a permeation depth Z (μm) of the specific dye 4 after the lapse of the certain period of time from the printing is further reduced as compared with the permeation depth Y of the specific dye 4 in the inkjet ink B containing the predetermined saccharide (Y>Z). For example, the permeation depth Z of the specific dye 4 in the inkjet ink C is reduced to about 50% of the permeation depth Y of the specific dye 4 in the inkjet ink B. More specifically, the inkjet ink C can further suppress the permeation of the specific dye 4. Therefore, the specific dye 4 remains at a high density on the surface 1S, and the decrease in the visibility of the printed images is suppressed as described above. Thus, even when the inkjet ink C is stored and used in a normal humidity environment (about 50% RH), the photodiscoloration and/or photofading of the printed images is sufficiently suppressed, and the inkjet ink C can enhance the lightfastness.

Meanwhile, the inkjet ink B allows the specific dye 4 to remain in the vicinity of the surface 1S inside the substrate 1 of the tablet, but the permeation of the specific dye 4 cannot be sufficiently suppressed and the ink cannot be fixed onto the surface 1S. More specifically, in the inkjet ink B, the density of the specific dye 4 remaining on the surface 1S is low, and therefore the photodiscoloration and/or photofading of the printed images cannot be sufficiently suppressed, and the lightfastness is not enhanced (improved).

Thus, the inkjet ink according to this embodiment is added with the reduced isomaltulose as the fixing agent, and therefore, even when the inkjet ink is stored and used in a normal humidity environment (about 50% RH), the permeation of the specific tar pigment (Blue No. 1) into the printing target is significantly suppressed and the ink is fixed to the surface of the printing target. Thus, the inkjet ink according to this embodiment can suppress the photodiscoloration and/or photofading of the printed images and enhance the lightfastness, and further, can suppress even the discoloration and/or fading of the printed images due to the permeation of the specific tar pigment into the printing target.

As illustrated in FIG. 1C, the inkjet ink C can be fixed onto the surface 1S of the substrate 1 of the tablet to be slightly raised. Thus, when the inkjet ink C is printed, for example, the printing is perceived as deep and floating on the surface 1S. Therefore, the inkjet ink C can enhance the visibility in the printing of the printed images as compared with the inkjet inks A, B, for example. More specifically, the inkjet ink according to this embodiment can impart good visibility to the printed images at the time of the printing in addition to reducing the decrease in the visibility due to the photodiscoloration and/or photofading of the printed images.

Hereinafter, the details of the lightfastness in the inkjet ink according to this embodiment are described.

The inkjet ink according to this embodiment may have a color difference ΔE of 20 or less according to JIS Z 8781 before and after a lightfastness test. Herein, the lightfastness test refers to a test of comparing the color differences ΔE (according to JIS Z 8781) for the printed images printed using the inkjet ink according to this embodiment, for example, the color difference ΔE indicating the change in the chromaticity and the optical color density before and after irradiation with visible light. Specifically, the color difference ΔE is measured before and after the emission of a cumulative 1.2 million lux of visible light to the printed images, and the values are compared. For the irradiation with the visible light, a xenon weather meter (Ci4000, Toyo Seiki Seisaku-sho, Ltd.) is used, for example. The printed images in the lightfastness test are solid-printed images solid-printed on a tablet (e.g., film-coated tablet), which is the printing targets, for example.

The lightfastness necessary and sufficient for the formation of the printed images on medicine tablets and the like refers to, in the lightfastness test in which the printed images are irradiated with a 1.2 million lux of visible light, a case where the color difference ΔE of the printed images before and after the irradiation with the visible light is 20 or less in many cases. Use of the color difference ΔE of 20 or less as the criterion of sufficient lightfastness has been derived as a result of opinion tests carried out by the present inventors with medical professionals. When the color difference ΔE exceeds 20, a decrease in the visibility (e.g., readability of printing) of the printed images begins to be perceived. More specifically, when the color difference ΔE before and after the irradiation with the visible light is 20 or less, it can be said that the inkjet ink sufficiently suppresses the photodiscoloration and/or photofading and has excellent lightfastness. Although this numerical value is larger than the standard color difference ΔE of 3 to 6 in general commercial printed matter, tablets before and after the exposure to light are usually not compared, and the printed images of the tablet surfaces are assumed to naturally fade, and therefore this numerical value was able to be obtained.

The reason why the inkjet ink according to this embodiment contains the reduced isomaltulose as the fixing agent is as follows. When a fixing agent other than the reduced isomaltulose (e.g., maltose) is added, the Blue No. 1 on the tablet surface is not sufficiently fixed to the surface of the printing target, and the color difference ΔE exceeds 20 when the above-described lightfastness test is performed for the solid-printed images. By adding the reduced isomaltulose as the fixing agent to thereby sufficiently fix the Blue No. 1 on the tablet surface to the surface of the printing target, the color difference ΔE before and after the lightfastness test becomes less than 20, and excellent lightfastness is imparted to the inkjet ink.

Hereinafter, each component constituting the inkjet ink according to this embodiment is described.

(Colorant)

As described above, the inkjet ink according to this embodiment contains at least the Blue No. 1 as the food dye. The blue No. 1 is an edible tar pigment, and is also referred to as Brilliant Blue FCF. In the inkjet ink according to this embodiment, the compounding ratio of the Blue No. 1, i.e., the content of the Blue No. 1, is preferably in the range of 0.1 mass % or more and 2.5 mass % or less based on the total mass of the ink. With this composition, good visibility can be imparted to the printed images and high intermittent resumability (i.e., excellent printability) can be imparted to the printed images. When the content of the Blue No. 1 is in the range above, the addition of the reduced isomaltulose, which is the fixing agent, can more reliably allow the Blue No. 1 to remain at a high density on the surface of printed matter to suppress the photodiscoloration and/or photofading in the printed images and reliably enhance the lightfastness of the inkjet ink according to this embodiment.

In contrast thereto, when the content of the Blue No. 1 is less than 0.1 mass %, the whole printed color tends to be lighter and the visibility of the printed images tends to decrease. Further, when the content of the Blue No. 1 is less than 0.1 mass %, the lightfastness decreases or the lightfastness is not exhibited in some cases when the inkjet ink is stored and used in a normal humidity environment (about 50% RH).

When the content of the Blue No. 1 exceeds 2.5 mass %, the dissolution stability of the colorant deteriorates, so that the pigment in the ink is precipitated or deposited as a solid, causing nozzle clogging of an inkjet head in printing, and so-called printing resumability (intermittent resumability) can deteriorate.

The content of the Blue No. 1 is more preferably in the range of 0.1 mass % or more and 2.5 mass % or less and still more preferably in the range of 0.2 mass % or more and 1.4 mass % or less based on the total mass of the ink.

The inkjet ink according to this embodiment may contain pigments (colorants) other than the Blue No. 1. The pigments other than the Blue No. 1 are not particularly limited insofar as they are edible. The pigments that can be added to the inkjet ink according to this embodiment can be appropriately selected from conventionally known synthetic food pigments and natural food pigments, for example, and added.

The synthetic food pigments include tar pigments, natural pigment derivatives, natural synthetic pigments, and the like, for example. The tar pigments include Food Red No. 2, Food Red No. 3, Food Red No. 40, Food Red No. 102, Food Red No. 104, Food Red No. 105, Food Red No. 106, Food Yellow No. 4, Food Yellow No. 5, Food Blue No. 2, Food Red No. 2 Aluminum Lake, Food Red No. 3 Aluminum Lake, Food Red No. 40 Aluminum Lake, Food Yellow No. 4 Aluminum Lake, Food No. 5 Aluminum Lake, Food Blue No. 1 Aluminum Lake, Food Blue No. 2 Aluminum Lake, and the like, for example. The natural pigment derivatives include norbixin potassium and the like, for example. The natural synthetic pigments include β-carotene, riboflavin, and the like, for example.

The natural food pigments include anthocyanin pigments, carotenoid pigments, quinone pigments, chlorophyll pigments, flavonoid pigments, betaine pigments, monascus pigments, and pigments originating from other natural products, for example. The anthocyanin pigments include a red radish pigment, a red cabbage pigment, a red rice pigment, an elderberry pigment, a cowberry pigment, a gooseberry pigment, a cranberry pigment, a salmonberry pigment, a perilla pigment, a thimblueberry pigment, a strawberry pigment, a dark sweet cherry pigment, a cherry pigment, a hibiscus pigment, a huckleberry pigment, a grape juice pigment, a grape skin pigment, a black currant pigment, a blackberry pigment, a blueberry pigment, a plum pigment, a whortle berry pigment, a boysenberry pigment, a mulberry pigment, a purple potato pigment, a purple corn pigment, a purple yam pigment, a raspberry pigment, a red currant pigment, a loganberry pigment, and other anthocyanin pigments, for example. The carotenoid pigments include an annatto pigment, a gardenia yellow pigment, and other carotenoid pigments, for example. The quinone pigments include a cochineal pigment, a lithospermum root pigment, a lac pigment, and other quinone pigments, for example. The flavonoid pigments include a safflower yellow pigment, a kaoliang pigment, an onion pigment, and other flavonoid pigments, for example. The betaine pigments include a beet red pigment, for example. The monascus pigments include a monascus pigment and a monascus yellow pigment, for example. The pigments originating from other natural products include a turmeric pigment, a trichotomine pigment, a gardenia red pigment, a spirulina blue pigment, and the like, for example.

(Fixing Agent)

As described above, the inkjet ink according to this embodiment contains the fixing agent for fixing the ink containing the Blue No. 1 to the surface of the printing target. Specifically, the fixing agent contained in the inkjet ink according to this embodiment is reduced isomaltulose. When the fixing agent is reduced isomaltulose, the addition of reduced isomaltulose to the inkjet ink together with a solvent having the component composition described later enables the fixation of the ink containing the Blue No. 1 to the surface of the printing target. This allows the inkjet ink according to this embodiment to sufficiently suppress the photodiscoloration and/or photofading of the printed images and enhance the lightfastness. Further, the reduced isomaltulose used as the fixing agent in this embodiment also has the function of suppressing the decomposition (photolysis) due to the irradiation with light of the inkjet ink. Therefore, the occurrence of the photodiscoloration and/or photofading itself can be suppressed.

The compounding ratio of the reduced isomaltulose which is the fixing agent in the inkjet ink according to this embodiment, i.e., the content (mass) of the reduced isomaltulose, is in the range of 5.7 times or more and 16.2 times or less the mass of the Blue No. 1 contained in the inkjet ink according to this embodiment. More specifically, a mass ratio between the reduced isomaltulose and the Blue No. 1 in the inkjet ink according to this embodiment (Mass of Reduced isomaltulose/Mass of Blue No. 1) is in the range of 5.7 or more and 16.2 or less. With this composition, the ink fixing effect by the reduced isomaltulose can be more reliably exhibited, and the lightfastness of the inkjet ink can be reliably enhanced. Further, high intermittent resumability can be imparted to the inkjet ink according to this embodiment.

In contrast thereto, when the compounding ratio of the reduced isomaltulose is less than 5.7 times the mass of the Blue No. 1, the ink fixing effect can decrease. When the compounding ratio of the reduced isomaltulose is less than 5.7 times the mass of the Blue No. 1, the lightfastness decreases or the lightfastness is not exhibited in some cases when the inkjet ink is stored and used in a normal humidity environment (about 50% RH).

When the compounding ratio of the reduced isomaltulose exceeds 16.2 times the mass of the Blue No. 1, the reduced isomaltulose in the ink is precipitated or deposited as a solid due to an increase in the ink viscosity or the deterioration of the dissolution stability of the reduced isomaltulose, causing nozzle clogging of an inkjet head in printing, and the intermittent resumability can decrease.

The compounding ratio of the reduced isomaltulose is preferably in the range of 5.7 times or more and 16.2 times or less and more preferably in the range of 7.3 times or more and 16.2 times or less the mass of the Blue No. 1.

When the compounding ratio of the reduced isomaltulose is preferably in the range of 4.0 mass % or more and 15.0 mass % or less and more preferably in the range of 5.1 mass % or more and 10 mass % or less based on the total mass of the ink.

When the compounding ratio of the reduced isomaltulose is less than 4.0 mass % based on the total mass of the ink, the ink fixing effect can decrease. When the compounding ratio of the reduced isomaltulose is less than 4.0 mass % based on the total mass of the ink, the lightfastness decreases or the lightfastness is not exhibited in some cases when the inkjet ink is stored and used in a normal humidity environment (about 50% RH).

When the compounding ratio of the reduced isomaltulose exceeds 15.0 mass % based on the total mass of the ink, the reduced isomaltulose in the ink is precipitated or deposited as a solid due to an increase in the ink viscosity or the deterioration of the dissolution stability of the reduced isomaltulose, causing nozzle clogging of an inkjet head in printing, and the intermittent resumability can deteriorate.

(Solvent)

The inkjet ink according to this embodiment contains, in addition to the Blue No. 1 and the reduced isomaltulose, a solvent (dispersion medium) to dissolve (disperse) the Blue No. 1 and the reduced isomaltulose. The inkjet ink according to this embodiment contains water (e.g., purified water) and at least one of propylene glycol and ethanol. More specifically, the solvent in this embodiment may contain water and propylene glycol, may contain water and ethanol, or may contain water, propylene glycol, and ethanol.

In general, the reduced isomaltulose has the property of hardly dissolving in alcohols. Therefore, in this embodiment, the solvent contains propylene glycol and ethanol, and therefore the solubility in the solvent of the reduced isomaltulose used as the fixing agent decreases. Thus, by adding the solvent containing the alcohols above (propylene glycol, ethanol) to the inkjet ink together with the reduced isomaltulose as the fixing agent in this embodiment, the ink fixing effect is reliably exhibited, and the Blue No. 1 contained in the ink can be allowed to remain at a higher density on the surface of the printing target (e.g., tablet). Thus, the inkjet ink according to this embodiment can sufficiently suppress the photodiscoloration and/or photofading of the printed images and can enhance the lightfastness.

The propylene glycol can function as a wetting agent to prevent the ink from drying at inkjet nozzles and impart sufficient intermittent resumability to the ink. The ethanol has high volatility, and thus can enhance the transfer resistance (drying properties) of the inkjet ink.

The compounding ratio of each component of the above-described solvent in the inkjet ink according to this embodiment is not limited. When the solvent contains propylene glycol, the compounding ratio of the propylene glycol, i.e., the addition amount of the propylene glycol, is in the range of 2 mass % or less based on the total mass of the ink. With this composition, printing can be performed without impairing the drying properties of the ink, and the effect of fixing the ink containing Blue No. 1 is further enhanced. Therefore, more excellent lightfastness can be imparted to the inkjet ink.

Meanwhile, when the addition amount of the propylene glycol exceeds 2 mass %, the drying of the printed surface on the tablet surface is delayed, sometimes causing a defect in which, when printed tablets are brought into contact with each other, undried ink adheres to other tablets and causes staining (poor transfer).

When the solvent contains ethanol, the compounding ratio of the ethanol, i.e., the addition amount of ethanol, is preferably in the range of 30 mass % or more and 60 mass % or less based on the total mass of the ink. With this composition, the solubility of the reduced isomaltulose in the solvent reliably decreases, and the effect of fixing the ink containing Blue No. 1 is further enhanced. Therefore, more excellent lightfastness can be imparted to the inkjet ink.

Meanwhile, when the addition amount of the ethanol is less than 30 mass %, the effect of reducing the solubility of the reduced isomaltulose in the solvent can decrease. Meanwhile, when the addition amount of the reduced isomaltulose exceeds 60 mass %, the ink is dried at the inkjet nozzles, causing nozzle clogging of the inkjet head in printing, and the intermittent resumability can decrease.

The inkjet ink according to this embodiment may further contain at least one of glycerol and isopropyl alcohol as the solvent. Specifically, the above-described solvent may further contain either glycerol or isopropyl alcohol or may further contain both glycerol and isopropyl alcohol. The glycerol functions as a wetting agent as with the above-described propylene glycol. Further, the isopropyl alcohol has high volatility as with the above-described ethanol, and therefore can enhance the transfer resistance (drying properties) of the inkjet ink.

(Internal-Sizing Resin)

The inkjet ink according to this embodiment may contain an internal-sizing resin in addition to the above-described pigment and solvent. The internal-sizing resin that can be added to the inkjet ink according to this embodiment may be an edible resin-like substance in the form of a water-soluble powder, a paste, or flakes capable of forming a coating film on the surface of a tablet when dried after printing. The internal-sizing resin includes polyvinyl alcohol (PVA), hydroxypropyl cellulose (HPC), hydroxypropyl methylcellulose (HPMC), polyvinylpyrrolidones (PVP), high molecular weight polyethylene glycol (PEG), such as polyethylene glycol 4000 or polyethylene glycol 1540, shellac resin, a methacrylic acid copolymer (product name: Eudragit S100), maltodextrin, erythritol, and the like, for example.

(Leveling Agent)

The inkjet ink according to this embodiment may contain a leveling agent in addition to the above-described pigment and solvent or the internal-sizing resin. The levelling agent that can be added to the inkjet ink according to this embodiment may be an edible and water-soluble surfactant. The levelling agent includes polyglycerol fatty acid ester (e.g., Decaglycerol distearate Q-182S or Decaglycerol monolaurate Q-12S manufactured by Taiyo Kagaku Co., Ltd.), sorbitan fatty acid ester (e.g., NIKKOLSL-10 manufactured by Nikko Chemicals Co., Ltd.), sucrose fatty acid ester (e.g., DK Ester F-110 manufactured by DKS Co. Ltd.), polysorbate (Emazole S-120 series manufactured by Kao Corporation), and the like, for example.

[Printing Method]

The inkjet ink according to this embodiment is not particularly limited in a printing method, and is applicable to printing using an inkjet device, such as a commercially available inkjet printer. Therefore, the inkjet ink according to this embodiment has a wide range of applications and is very useful. For example, the inkjet ink according to this embodiment can be printed using a so-called drop-on-demand inkjet device including a piezoelectric element (piezoelectric ceramic) as an actuator or can be printed also using inkjet devices of other types.

The drop-on-demand inkjet device includes a thermal-inkjet type device discharging an inkjet ink using steam pressure generated by instantaneously heating a micro-heating element to a high temperature (200° C. to 300° C.), an electrostatic type device discharging an inkjet ink by electrostatically vibrating an actuator, an ultrasonic type device using an ultrasonic cavitation phenomenon, and the like, for example. When the inkjet ink according to this embodiment has charging performance, a continuous ejection type device is also usable.

[Tablet]

In this embodiment, the inkjet ink according to this embodiment may be used for printing characters or images on the surfaces of tablets, for example, using the above-described printing methods. More specifically, the tablet according to this embodiment may include printed parts, i.e., printed images, printed using the inkjet ink according to this embodiment. Insofar as the inkjet ink according to this embodiment is used, the lightfastness of the printed images provided on the surfaces of medicine tablets using the inkjet printing methods can be enhanced. Hereinafter, the composition of the tablet including the printed images printed using the inkjet ink according to this embodiment is described.

The tablet according to this embodiment is, for example, a medicine tablet. Herein, the "medicine tablet" includes film-coated tablets having an outermost surface on which a water-soluble surface layer is formed, for example, besides uncoated tablets (bare tablets), sugarcoated tablets, enteric tablets, orally disintegrating tablets, and the like.

Figure 2:
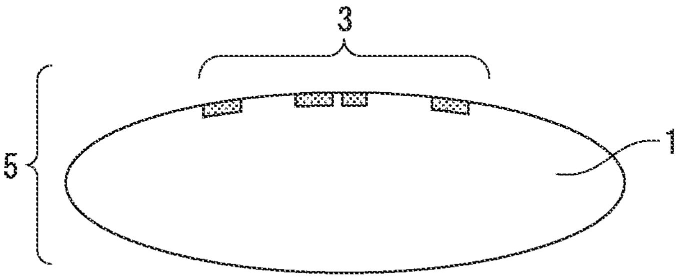
FIG. 2 is a schematic cross-sectional view illustrating one example of a tablet (uncoated tablet) according to the embodiment of the present invention.

FIG. 2 is a schematic cross-sectional view illustrating one example of a medicine tablet (uncoated tablet) provided with printing (characters or images). FIG. 2 illustrates uncoated tablet printed matter 5, in cross-sectional view, with printed images 3, such as characters, printed on the upper surface of the substrate 1 of the tablet.

Figure 3:
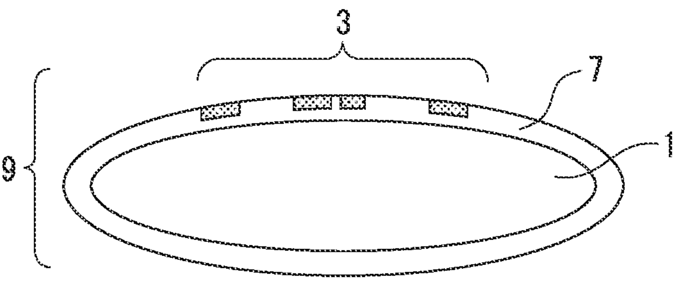
FIG. 3 is a schematic cross-sectional view illustrating one example of a tablet (film-coated tablet) according to the embodiment of the present invention.

FIG. 3 is a schematic cross-sectional view illustrating one example of a medicine tablet (film-coated tablet) provided with printing (characters or images). FIG. 3 illustrates film-coated tablet printed matter 9, in cross-sectional view, with the printed images 3, such as characters, printed on the upper surface of the substrate 1 of the tablet, on the surface of which a film coating layer 7 is formed.

Figure 4:
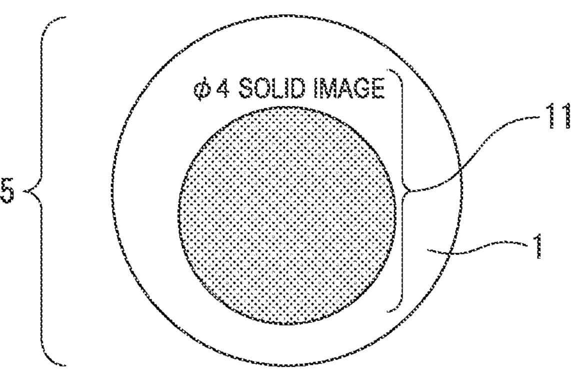
FIG. 4 is one example of a printed image of the tablet (uncoated tablet) according to the embodiment of the present invention.
Figure 5:
FIG. 5 is one example of a printed image of the tablet (film-coated tablet) according to the embodiment of the present invention.

In this embodiment, a solid image may be printed as an uncoated tablet printed image 11 as illustrated in FIG. 4, or a two-dimensional barcode may be printed as a film-coated tablet printed image 13 as illustrated in FIG. 5.

The medicine tablet contains active ingredients without being particularly limited. The active ingredients include, but are not limited to, substances effective for preventing or treating various diseases (e.g., substances having a sleep-inducing effect, tranquilizer activity, antibacterial activity, antihypertensive effect, anti-angina activity, analgesic effect, anti-inflammatory activity, tranquilizing effect, diabetes treatment activity, diuretic effect, anticholinergic activity, anti-hyperacidity effect, antiepileptic effect, ACE inhibitory activity, ß-receptor antagonist or agonist activity, anesthetic action, appetite suppressant action, antiarrhythmic effect, antidepressant effect, anticoagulant activity, antidiarrheal effect, antihistamine activity, antimalarial effect, antitumor activity, immunosuppressive activity, antiparkinsonian effect, antipsychotic effect, antiplatelet activity, antihyperlipidemic effect, and the like), substances having a cleaning effect, substances having a scent or a deodorant action, and the like, for example.

In the tablet according to this embodiment, carriers acceptable for the intended use can be compounded as required together with the active ingredients. For example, medicine tablets can be compounded with pharmaceutically acceptable carriers. As the pharmaceutically acceptable carriers, various organic or inorganic carrier substances, which are commonly used as formulation materials, are used, and excipients, lubricants, binders, disintegrants, thickeners, and the like are compounded, for example, as appropriate. Further, additives, such as antiseptics, antioxidants, coloring agents, and sweeteners, are also usable as required.

Although this embodiment is described taking the medicine tablet as an example of the tablet, the tablets are not limited to the tablets of the present invention. The printing targets of the inkjet ink according to this embodiment are not particularly limited. For example, the inkjet ink according to this embodiment may be printed on the surfaces of various tablets, such as tablets to be administered to non-human animals (pets, livestock, poultry, and the like), or tablets of feed, fertilizers, cleaning agents, and food tablets, such as confectionery tablets, e.g., soda-pop candy, and supplement tablets. The inkjet ink according to this embodiment is not particularly limited in the size of the printing target, and is applicable to tablets of various sizes.

Advantageous Effects of this Embodiment (1) The inkjet ink according to this embodiment contains: Blue No. 1 as the food dye in the range of 0.1 mass % or more and 2.5 mass % or less based on the total mass of the inkjet ink; and reduced isomaltulose as the fixing agent in the range of 5.7 times or more and 16.2 times or less the mass of the Blue No. 1.

With this composition, when the inkjet ink is stored and used in a normal humidity environment (about 50% RH), the photodiscoloration and/or photofading of the printed images can be sufficiently suppressed and excellent lightfastness can be imparted to the inkjet ink as compared with conventional technologies.

(2) In the inkjet ink according to this embodiment, the compounding ratio of the reduced isomaltulose may be in the range of 4.0 mass % or more and 15.0 mass % or less based on the total mass of the inkjet ink.

With this composition, when the inkjet ink is stored and used in a normal humidity environment (about 50% RH), the photodiscoloration and/or photofading of the printed images can be sufficiently suppressed and excellent lightfastness can be imparted to the inkjet ink as compared with conventional technologies.

(3) The inkjet ink according to this embodiment may contain water and PG or ethanol as the solvent.

With this composition, when the inkjet ink is stored and used in a normal humidity environment (about 50% RH), the performance (enhancement of intermittent resumability or enhancement of tablet drying properties) corresponding to each component of the solvent can be imparted to the ink while excellent lightfastness is imparted to the inkjet ink as compared with conventional technologies.

(4) The inkjet ink according to this embodiment may contain at least water, PG, and ethanol as the solvent.

With this composition, when the inkjet ink is stored and used in a normal humidity environment (about 50% RH), the performance (enhancement of intermittent resumability or enhancement of tablet drying properties) corresponding to each component of the solvent can be imparted to the ink while excellent lightfastness is imparted to the inkjet ink as compared with conventional technologies.

(5) The inkjet ink according to this embodiment may contain only three types of solvents: water, PG, and ethanol.

With this composition, when the inkjet ink is stored and used in a normal humidity environment (about 50% RH), the performance (enhancement of intermittent resumability or enhancement of tablet drying properties) corresponding to each component of the solvent can be imparted to the ink while excellent lightfastness is imparted to the inkjet ink as compared with conventional technologies.

(6) The inkjet ink according to this embodiment may contain Blue No. 1 as the food dye in the range of 0.5 mass % or more and 0.7 mass % or less based on the total mass of the inkjet ink.

With this composition, when the inkjet ink is stored and used in a normal humidity environment (about 50% RH), the performance (enhancement of intermittent resumability or enhancement of tablet drying properties) corresponding to each component of the solvent can be imparted to the ink while excellent lightfastness is imparted to the inkjet ink as compared with conventional technologies.

(7) The inkjet ink according to this embodiment may contain Yellow No. 4 as the food dye in the range of 0.3 mass % or more and 1.0 mass % or less based on the total mass of the inkjet ink.

With this composition, when the inkjet ink is stored and used in a normal humidity environment (about 50% RH), the performance (enhancement of intermittent resumability or enhancement of tablet drying properties) corresponding to each component of the solvent can be imparted to the ink while excellent lightfastness is imparted to the inkjet ink as compared with conventional technologies.

(8) The inkjet ink according to this embodiment may contain Red No. 102 as the food dye in the range of 0.9 mass % or more and 1.0 mass % or less based on the total mass of the inkjet ink.

With this composition, when the inkjet ink is stored and used in a normal humidity environment (about 50% RH), the performance (enhancement of intermittent resumability or enhancement of tablet drying properties) corresponding to each component of the solvent can be imparted to the ink while excellent lightfastness is imparted to the inkjet ink as compared with conventional technologies.

(9) The inkjet ink according to this embodiment may contain, as the food dye, Blue No. 1 in the range of 0.5 mass % or more and 0.7 mass % or less based on the total mass of the inkjet ink, Yellow No. 4 in the range of 0.3 mass % or more and 1.0 mass % or less based on the total mass of the inkjet ink, and Red No. 102 in the range of 0.9 mass % or more and 1.0 mass % based on the total mass of the inkjet ink.

With this composition, when the inkjet ink is stored and used in a normal humidity environment (about 50% RH), the performance (enhancement of intermittent resumability or enhancement of tablet drying properties) corresponding to each component of the solvent can be imparted to the ink while excellent lightfastness is imparted to the inkjet ink as compared with conventional technologies.

(10) The inkjet ink according to this embodiment may contain the food dye including the Blue No. 1, the Yellow No. 4, and the Red No. 102 in the range of 1.8 mass % or more and 2.6 mass % or less based on the total mass of the inkjet ink.

With this composition, when the inkjet ink is stored and used in a normal humidity environment (about 50% RH), the performance (enhancement of intermittent resumability or enhancement of tablet drying properties) corresponding to each component of the solvent can be imparted to the ink while excellent lightfastness is imparted to the inkjet ink as compared with conventional technologies.

(11) The inkjet ink according to this embodiment may contain water as the solvent in the range of 50.2 mass % or more and 60.9 mass % or less based on the total mass of the inkjet ink.

With this composition, when the inkjet ink is stored and used in a normal humidity environment (about 50% RH), the performance (enhancement of intermittent resumability or enhancement of tablet drying properties) corresponding to each component of the solvent can be imparted to the ink while excellent lightfastness is imparted to the inkjet ink as compared with conventional technologies.

(12) The inkjet ink according to this embodiment may contain ethanol as the solvent in the range of 30.0 mass % or more and 40.0 mass % or less based on the total mass of the inkjet ink.

With this composition, when the inkjet ink is stored and used in a normal humidity environment (about 50% RH), the performance (enhancement of intermittent resumability or enhancement of tablet drying properties) corresponding to each component of the solvent can be imparted to the ink while excellent lightfastness is imparted to the inkjet ink as compared with conventional technologies.

(13) In the inkjet ink according to this embodiment, the compounding ratio of the reduced isomaltulose may be in the range of 5.6 mass % or more and 7.9 mass % or less based on the total mass of the inkjet ink.

With this composition, when the inkjet ink is stored and used in a normal humidity environment (about 50% RH), the performance (enhancement of intermittent resumability or enhancement of tablet drying properties) corresponding to each component of the solvent can be imparted to the ink while excellent lightfastness is imparted to the inkjet ink as compared with conventional technologies.

(14) The inkjet ink according to this embodiment contains, as the solvent, water in the range of 50.2 mass % or more and 60.9 mass % or less based on the total mass of the inkjet ink, ethanol in the range of 30.0 mass % or more and 40.0 mass % or less based on the total mass of the inkjet ink, and PG in the proportion of 0.1 mass % based on the total mass of the inkjet ink.

With this composition, when the inkjet ink is stored and used in a normal humidity environment (about 50% RH), the performance (enhancement of intermittent resumability or enhancement of tablet drying properties) corresponding to each component of the solvent can be imparted to the ink while excellent lightfastness is imparted to the inkjet ink as compared with conventional technologies.

(15) The tablet printed matter according to this embodiment includes the printed images (one example of the printed parts) 3 printed with the above-described inkjet ink.

With this composition, when the inkjet ink is stored and used in a normal humidity environment (about 50% RH), the photodiscoloration and/or photofading in the printed images 3 and the like directly printed on the surface or the like of the tablet can be sufficiently suppressed and the lightfastness of the printed images 3 and the like can be sufficiently enhanced. Further, edibility can be imparted also to a printed image portion printed on the surface of the tablet.

EXAMPLES

Hereinafter, the present invention is described in more detail with reference to Examples but the present invention is not limited to Examples.

Example 1

Hereinafter, a procedure of preparing an inkjet ink according to Example 1 is described.

(Production of Inkjet Ink)

First, a printing ink was prepared. An inkjet ink contains components, such as a pigment (colorant), a solvent, and a fixing agent (reduced isomaltulose). As the preparation procedure, first, reduced isomaltulose, which is the fixing agent, was added to the solvent to give a transparent base liquid. Subsequently, a food dye was added to the transparent base liquid. Thus, an ink according to this example was prepared. Hereinafter, the individual components are specifically described.

In Examples 1 to 26 and Comparative Examples 1 to 6, purified water (ion-exchanged water), and propylene glycol, ethanol, and isopropyl alcohol (IPA: 2-propanol) were individually used as required for the solvent.

In this example, propylene glycol, ethanol, and isopropyl alcohol were added to purified water, and the mixture was thoroughly stirred to give a solvent (mixed solvent). Reduced isomaltulose was added as the fixing agent to the solvent above, and the mixture was stirred for about 1 hour to give a transparent base liquid. Blue No. 1, Yellow No. 4, and Red No. 102, which are the food dyes, were added as the colorant to the transparent base liquid above to give an inkjet ink of Example 1. Based on the total inkjet ink of Example 1, the compounding ratio of the Blue No. 1, which is the colorant, was set to 0.7 mass %, the compounding ratio of the Yellow No. 4, which is the colorant, was set to 1.0 mass %, the compounding ratio of the Red No. 102, which is the colorant, was set to 0.9 mass %, the compounding ratio of the purified water among the solvents was set to 63.3 mass %, the compounding ratio of the propylene glycol among the solvents was set to 0.1 mass %, the compounding ratio of the ethanol among the solvents was set to 30.0 mass %, and the compounding ratio of the reduced isomaltulose, which is the fixing agent, was set to 4.0 mass %.

Thus, the mass ratio between the reduced isomaltulose and the Blue No. 1 (Mass of reduced isomaltulose/Mass of Blue No. 1) in the inkjet ink of Example 1 was adjusted to 5.7.

Example 2

In this example, based on the total inkjet ink, the compounding ratio of the Blue No. 1 was set to 0.7 mass %, the compounding ratio of the Yellow No. 4 was set to 1.0 mass %, the compounding ratio of the Red No. 102 was set to 0.9 mass %, the compounding ratio of the purified water was set to 62.5 mass %, the compounding ratio of the propylene glycol was set to 0.1 mass %, the compounding ratio of the ethanol was set to 30.0 mass %, and the compounding ratio of the reduced isomaltulose was set to 4.8 mass %. An inkjet ink of Example 2 was obtained in the same manner as in Example 1, except for the above.

Thus, the mass ratio between the reduced isomaltulose and the Blue No. 1 (Mass of reduced isomaltulose/Mass of Blue No. 1) in the inkjet ink of Example 2 was adjusted to 6.9.

Example 3

In this example, based on the total inkjet ink, the compounding ratio of the Blue No. 1 was set to 0.7 mass %, the compounding ratio of the Yellow No. 4 was set to 1.0 mass %, the compounding ratio of the Red No. 102 was set to 0.9 mass %, the compounding ratio of the purified water was set to 62.2 mass %, the compounding ratio of the propylene glycol was set to 0.1 mass %, the compounding ratio of the ethanol was set to 30.0 mass %, and the compounding ratio of the reduced isomaltulose was set to 5.1 mass %. An inkjet ink of Example 3 was obtained in the same manner as in Example 1, except for the above.

Thus, the mass ratio between the reduced isomaltulose and the Blue No. 1 (Mass of reduced isomaltulose/Mass of Blue No. 1) in the inkjet ink of Example 3 was adjusted to 7.3.

Example 4

In this example, based on the total inkjet ink, the compounding ratio of the Blue No. 1 was set to 0.7 mass %, the compounding ratio of the Yellow No. 4 was set to 1.0 mass %, the compounding ratio of the Red No. 102 was set to 0.9 mass %, the compounding ratio of the purified water was set to 61.7 mass %, the compounding ratio of the propylene glycol was set to 0.1 mass %, the compounding ratio of the ethanol was set to 30.0 mass %, and the compounding ratio of the reduced isomaltulose was set to 5.6 mass %. An inkjet ink of Example 4 was obtained in the same manner as in Example 1, except for the above.

Thus, the mass ratio between the reduced isomaltulose and the Blue No. 1 (Mass of reduced isomaltulose/Mass of Blue No. 1) in the inkjet ink of Example 4 was adjusted to 8.0.

Example 5

In this example, based on the total inkjet ink, the compounding ratio of the Blue No. 1 was set to 1.1 mass %, the compounding ratio of the Yellow No. 4 was set to 1.6 mass %, the compounding ratio of the Red No. 102 was set to 1.5 mass %, the compounding ratio of the purified water was set to 55.7 mass %, the compounding ratio of the propylene glycol was set to 0.1 mass %, the compounding ratio of the ethanol was set to 30.0 mass %, and the compounding ratio of the reduced isomaltulose was set to 10.0 mass %. An inkjet ink of Example 5 was obtained in the same manner as in Example 1, except for the above.

Thus, the mass ratio between the reduced isomaltulose and the Blue No. 1 (Mass of reduced isomaltulose/Mass of Blue No. 1) in the inkjet ink of Example 5 was adjusted to 9.1.

Example 6

In this example, based on the total inkjet ink, the compounding ratio of the Blue No. 1 was set to 0.7 mass %, the compounding ratio of the Yellow No. 4 was set to 1.0 mass %, the compounding ratio of the Red No. 102 was set to 0.9 mass %, the compounding ratio of the purified water was set to 60.9 mass %, the compounding ratio of the propylene glycol was set to 0.1 mass %, the compounding ratio of the ethanol was set to 30.0 mass %, and the compounding ratio of the reduced isomaltulose was set to 6.4 mass %. An inkjet ink of Example 6 was obtained in the same manner as in Example 1, except for the above.

Thus, the mass ratio between the reduced isomaltulose and the Blue No. 1 (Mass of reduced isomaltulose/Mass of Blue No. 1) in the inkjet ink of Example 6 was adjusted to 9.1.

Example 7

In this example, based on the total inkjet ink, the compounding ratio of the Blue No. 1 was set to 0.5 mass %, the compounding ratio of the Yellow No. 4 was set to 0.3 mass %, the compounding ratio of the Red No. 102 was set to 1.0 mass %, the compounding ratio of the purified water was set to 50.2 mass %, the compounding ratio of the propylene glycol was set to 0.1 mass %, the compounding ratio of the ethanol was set to 40.0 mass %, and the compounding ratio of the reduced isomaltulose was set to 7.9 mass %. An inkjet ink of Example 7 was obtained in the same manner as in Example 1, except for the above.

Thus, the mass ratio between the reduced isomaltulose and the Blue No. 1 (Mass of reduced isomaltulose/Mass of Blue No. 1) in the inkjet ink of Example 7 was adjusted to 15.8.

Example 8

In this example, based on the total inkjet ink, the compounding ratio of the Blue No. 1 was set to 0.5 mass %, the compounding ratio of the Yellow No. 4 was set to 0.3 mass %, the compounding ratio of the Red No. 102 was set to 1.0 mass %, the compounding ratio of the purified water was set to 50.0 mass %, the compounding ratio of the propylene glycol was set to 0.1 mass %, the compounding ratio of the ethanol was set to 40.0 mass %, and the compounding ratio of the reduced isomaltulose was set to 8.1 mass %. An inkjet ink of Example 8 was obtained in the same manner as in Example 1, except for the above.

Thus, the mass ratio between the reduced isomaltulose and the Blue No. 1 (Mass of reduced isomaltulose/Mass of Blue No. 1) in the inkjet ink of Example 8 was adjusted to 16.2.

Example 9

In this example, based on the total inkjet ink, the compounding ratio of the Blue No. 1 was set to 0.7 mass %, the compounding ratio of the Yellow No. 4 was set to 1.0 mass %, the compounding ratio of the Red No. 102 was set to 0.9 mass %, the compounding ratio of the purified water was set to 60.9 mass %, the compounding ratio of the propylene glycol was set to 0.1 mass %, the compounding ratio of the isopropyl alcohol (IPA) was set to 30.0 mass %, and the compounding ratio of the reduced isomaltulose was set to 6.4 mass %. An inkjet ink of Example 9 was obtained in the same manner as in Example 1, except for the above.

Thus, the mass ratio between the reduced isomaltulose and the Blue No. 1 (Mass of reduced isomaltulose/Mass of Blue No. 1) in the inkjet ink of Example 9 was adjusted to 9.1.

Example 10

In this example, based on the total inkjet ink, the compounding ratio of the Blue No. 1 was set to 0.7 mass %, the compounding ratio of the Yellow No. 4 was set to 1.0 mass %, the compounding ratio of the Red No. 102 was set to 0.9 mass %, the compounding ratio of the purified water was set to 30.9 mass %, the compounding ratio of the propylene glycol was set to 0.1 mass %, the compounding ratio of the isopropyl alcohol was set to 60.0 mass %, and the compounding ratio of the reduced isomaltulose was set to 6.4 mass %. An inkjet ink of Example 10 was obtained in the same manner as in Example 1, except for the above.

Thus, the mass ratio between the reduced isomaltulose and the Blue No. 1 (Mass of reduced isomaltulose/Mass of Blue No. 1) in the inkjet ink of Example 10 was adjusted to 9.1.

Example 11

In this example, based on the total inkjet ink, the compounding ratio of the Blue No. 1 was set to 0.7 mass %, the compounding ratio of the Yellow No. 4 was set to 1.0 mass %, the compounding ratio of the Red No. 102 was set to 0.9 mass %, the compounding ratio of the purified water was set to 61.0 mass %, the compounding ratio of the propylene glycol was set to 0 mass % (i.e., not containing propylene glycol), the compounding ratio of the isopropyl alcohol was set to 30.0 mass %, and the compounding ratio of the reduced isomaltulose was set to 6.4 mass %. An inkjet ink of Example 11 was obtained in the same manner as in Example 1, except for the above.

Thus, the mass ratio between the reduced isomaltulose and the Blue No. 1 (Mass of reduced isomaltulose/Mass of Blue No. 1) in the inkjet ink of Example 11 was adjusted to 9.1.

Example 12

In this example, based on the total inkjet ink, the compounding ratio of the Blue No. 1 was set to 0.1 mass %, the compounding ratio of the Yellow No. 4 was set to 0.3 mass %, the compounding ratio of the Red No. 102 was set to 1.0 mass %, the compounding ratio of the purified water was set to 56.9 mass %, the compounding ratio of the propylene glycol was set to 0.1 mass %, the compounding ratio of the ethanol was set to 40.0 mass %, and the compounding ratio of the reduced isomaltulose was set to 1.6 mass %. An inkjet ink of Example 12 was obtained in the same manner as in Example 1, except for the above.

Thus, the mass ratio between the reduced isomaltulose and the Blue No. 1 (Mass of reduced isomaltulose/Mass of Blue No. 1) in the inkjet ink of Example 12 was adjusted to 16.0.

Example 13

In this example, based on the total inkjet ink, the compounding ratio of the Blue No. 1 was set to 0.2 mass %, the compounding ratio of the Yellow No. 4 was set to 0.3 mass %, the compounding ratio of the Red No. 102 was set to 1.0 mass %, the compounding ratio of the purified water was set to 55.3 mass %, the compounding ratio of the propylene glycol was set to 0.1 mass %, the compounding ratio of the ethanol was set to 40.0 mass %, and the compounding ratio of the reduced isomaltulose was set to 3.1 mass %. An inkjet ink of Example 13 was obtained in the same manner as in Example 1, except for the above.

Thus, the mass ratio between the reduced isomaltulose and the Blue No. 1 (Mass of reduced isomaltulose/Mass of Blue No. 1) in the inkjet ink of Example 13 was adjusted to 15.5.

Example 14

In this example, based on the total inkjet ink, the compounding ratio of the Blue No. 1 was set to 0.3 mass %, the compounding ratio of the Yellow No. 4 was set to 0.3 mass %, the compounding ratio of the Red No. 102 was set to 1.0 mass %, the compounding ratio of the purified water was set to 53.6 mass %, the compounding ratio of the propylene glycol was set to 0.1 mass %, the compounding ratio of the ethanol was set to 40.0 mass %, and the compounding ratio of the reduced isomaltulose was set to 4.7 mass %. An inkjet ink of Example 14 was obtained in the same manner as in Example 1, except for the above.

Thus, the mass ratio between the reduced isomaltulose and the Blue No. 1 (Mass of reduced isomaltulose/Mass of Blue No. 1) in the inkjet ink of Example 14 was adjusted to 15.7.

Example 15

In this example, based on the total inkjet ink, the compounding ratio of the Blue No. 1 was set to 0.6 mass %, the compounding ratio of the Yellow No. 4 was set to 0.8 mass %, the compounding ratio of the Red No. 102 was set to 0.7 mass %, the compounding ratio of the purified water was set to 43.8 mass %, the compounding ratio of the propylene glycol was set to 0.1 mass %, the compounding ratio of the ethanol was set to 50.0 mass %, and the compounding ratio of the reduced isomaltulose was set to 4.0 mass %. An inkjet ink of Example 15 was obtained in the same manner as in Example 1, except for the above.

Thus, the mass ratio between the reduced isomaltulose and the Blue No. 1 (Mass of reduced isomaltulose/Mass of Blue No. 1) in the inkjet ink of Example 15 was adjusted to 6.7.

Example 16

In this example, based on the total inkjet ink, the compounding ratio of the Blue No. 1 was set to 1.4 mass %, the compounding ratio of the Yellow No. 4 was set to 1.6 mass %, the compounding ratio of the Red No. 102 was set to 1.5 mass %, the compounding ratio of the purified water was set to 53.4 mass %, the compounding ratio of the propylene glycol was set to 0.1 mass %, the compounding ratio of the ethanol was set to 30.0 mass %, and the compounding ratio of the reduced isomaltulose was set to 12.0 mass %. An inkjet ink of Example 16 was obtained in the same manner as in Example 1, except for the above.

Thus, the mass ratio between the reduced isomaltulose and the Blue No. 1 (Mass of reduced isomaltulose/Mass of Blue No. 1) in the inkjet ink of Example 16 was adjusted to 8.6.

Example 17

In this example, based on the total inkjet ink, the compounding ratio of the Blue No. 1 was set to 1.5 mass %, the compounding ratio of the Yellow No. 4 was set to 0 mass % (i.e., not containing Yellow No. 4), the compounding ratio of the Red No. 102 was set to 0 mass % (i.e., not containing Red No. 102), the compounding ratio of the purified water was set to 45.4 mass %, the compounding ratio of the propylene glycol was set to 0.1 mass %, the compounding ratio of the ethanol was set to 40.0 mass %, and the compounding ratio of the reduced isomaltulose was set to 13.0 mass %. An inkjet ink of Example 17 was obtained in the same manner as in Example 1, except for the above.

Thus, the mass ratio between the reduced isomaltulose and the Blue No. 1 (Mass of reduced isomaltulose/Mass of Blue No. 1) in the inkjet ink of Example 17 was adjusted to 8.7.

Example 18

In this example, based on the total inkjet ink, the compounding ratio of the Blue No. 1 was set to 2.1 mass %, the compounding ratio of the Yellow No. 4 was set to 0.3 mass %, the compounding ratio of the Red No. 102 was set to 1.0 mass %, the compounding ratio of the purified water was set to 41.5 mass %, the compounding ratio of the propylene glycol was set to 0.1 mass %, the compounding ratio of the ethanol was set to 40.0 mass %, and the compounding ratio of the reduced isomaltulose was set to 15.0 mass %. An inkjet ink of Example 18 was obtained in the same manner as in Example 1, except for the above.

Thus, the mass ratio between the reduced isomaltulose and the Blue No. 1 (Mass of reduced isomaltulose/Mass of Blue No. 1) in the inkjet ink of Example 18 was adjusted to 7.1.

Example 19

In this example, based on the total inkjet ink, the compounding ratio of the Blue No. 1 was set to 2.5 mass %, the compounding ratio of the Yellow No. 4 was set to 0.3 mass %, the compounding ratio of the Red No. 102 was set to 1.0 mass %, the compounding ratio of the purified water was set to 41.1 mass %, the compounding ratio of the propylene glycol was set to 0.1 mass %, the compounding ratio of the ethanol was set to 40.0 mass %, and the compounding ratio of the reduced isomaltulose was set to 15.0 mass %. An inkjet ink of Example 19 was obtained in the same manner as in Example 1, except for the above.

Thus, the mass ratio between the reduced isomaltulose and the Blue No. 1 (Mass of reduced isomaltulose/Mass of Blue No. 1) in the inkjet ink of Example 19 was adjusted to 6.0.

Example 20

In this example, based on the total inkjet ink, the compounding ratio of the Blue No. 1 was set to 0.7 mass %, the compounding ratio of the Yellow No. 4 was set to 1.0 mass %, the compounding ratio of the Red No. 102 was set to 0.9 mass %, the compounding ratio of the purified water was set to 51.7 mass %, the compounding ratio of the propylene glycol was set to 0.1 mass %, the compounding ratio of the ethanol was set to 40.0 masse, and the compounding ratio of the reduced isomaltulose was set to 5.6 mass %. An inkjet ink of Example 20 was obtained in the same manner as in Example 1, except for the above.

Thus, the mass ratio between the reduced isomaltulose and the Blue No. 1 (Mass of reduced isomaltulose/Mass of Blue No. 1) in the inkjet ink of Example 20 was adjusted to 8.0.

Example 21

In this example, based on the total inkjet ink, the compounding ratio of the Blue No. 1 was set to 0.6 mass %, the compounding ratio of the Yellow No. 4 was set to 0.8 mass %, the compounding ratio of the Red No. 102 was set to 0.7 mass %, the compounding ratio of the purified water was set to 33.8 mass %, the compounding ratio of the propylene glycol was set to 0.1 mass %, the compounding ratio of the ethanol was set to 60.0 mass %, and the compounding ratio of the reduced isomaltulose was set to 4.0 mass %. An inkjet ink of Example 21 was obtained in the same manner as in Example 1, except for the above.

Thus, the mass ratio between the reduced isomaltulose and the Blue No. 1 (Mass of reduced isomaltulose/Mass of Blue No. 1) in the inkjet ink of Example 21 was adjusted to 6.7.

Example 22

In this example, based on the total inkjet ink, the compounding ratio of the Blue No. 1 was set to 0.7 mass %, the compounding ratio of the Yellow No. 4 was set to 1.0 mass %, the compounding ratio of the Red No. 102 was set to 0.9 mass %, the compounding ratio of the purified water was set to 61.8 mass %, the compounding ratio of the propylene glycol was set to 0 mass % (i.e., not containing propylene glycol), the compounding ratio of the ethanol was set to 30.0 mass %, and the compounding ratio of the reduced isomaltulose was set to 5.6 mass %. An inkjet ink of Example 22 was obtained in the same manner as in Example 1, except for the above.

Thus, the mass ratio between the reduced isomaltulose and the Blue No. 1 (Mass of reduced isomaltulose/Mass of Blue No. 1) in the inkjet ink of Example 22 was adjusted to 8.0.

Example 23

In this example, based on the total inkjet ink, the compounding ratio of the Blue No. 1 was set to 0.7 mass %, the compounding ratio of the Yellow No. 4 was set to 1.0 mass %, the compounding ratio of the Red No. 102 was set to 0.9 mass %, the compounding ratio of the purified water was set to 61.3 mass %, the compounding ratio of the propylene glycol was set to 0.5 mass %, the compounding ratio of the ethanol was set to 30.0 mass %, and the compounding ratio of the reduced isomaltulose was set to 5.6 mass %. An inkjet ink of Example 23 was obtained in the same manner as in Example 1, except for the above.

Thus, the mass ratio between the reduced isomaltulose and the Blue No. 1 (Mass of reduced isomaltulose/Mass of Blue No. 1) in the inkjet ink of Example 23 was adjusted to 8.0.

Example 24

In this example, based on the total inkjet ink, the compounding ratio of the Blue No. 1 was set to 0.7 mass %, the compounding ratio of the Yellow No. 4 was set to 1.0 mass %, the compounding ratio of the Red No. 102 was set to 0.9 mass %, the compounding ratio of the purified water was set to 60.8 mass %, the compounding ratio of the propylene glycol was set to 1.0 mass %, the compounding ratio of the ethanol was set to 30.0 mass %, and the compounding ratio of the reduced isomaltulose was set to 5.6 mass %. An inkjet ink of Example 24 was obtained in the same manner as in Example 1, except for the above.

Thus, the mass ratio between the reduced isomaltulose and the Blue No. 1 (Mass of reduced isomaltulose/Mass of Blue No. 1) in the inkjet ink of Example 24 was adjusted to 8.0.

Example 25

In this example, based on the total inkjet ink, the compounding ratio of the Blue No. 1 was set to 0.7 mass %, the compounding ratio of the Yellow No. 4 was set to 1.0 mass %, the compounding ratio of the Red No. 102 was set to 0.9 mass %, the compounding ratio of the purified water was set to 60.3 mass %, the compounding ratio of the propylene glycol was set to 1.5 mass %, the compounding ratio of the ethanol was set to 30.0 mass %, and the compounding ratio of the reduced isomaltulose was set to 5.6 mass %. An inkjet ink of Example 25 was obtained in the same manner as in Example 1, except for the above.

Thus, the mass ratio between the reduced isomaltulose and the Blue No. 1 (Mass of reduced isomaltulose/Mass of Blue No. 1) in the inkjet ink of Example 25 was adjusted to 8.0.

Example 26

In this example, based on the total inkjet ink, the compounding ratio of the Blue No. 1 was set to 0.7 mass %, the compounding ratio of the Yellow No. 4 was set to 1.0 mass %, the compounding ratio of the Red No. 102 was set to 0.9 mass %, the compounding ratio of the purified water was set to 59.8 mass %, the compounding ratio of the propylene glycol was set to 2.0 mass %, the compounding ratio of the ethanol was set to 30.0 mass %, and the compounding ratio of the reduced isomaltulose was set to 5.6 mass %. An inkjet ink of Example 26 was obtained in the same manner as in Example 1, except for the above.

Thus, the mass ratio between the reduced isomaltulose and the Blue No. 1 (Mass of reduced isomaltulose/Mass of Blue No. 1) in the inkjet ink of Example 26 was adjusted to 8.0.

Comparative Example 1

In this comparative example, based on the total inkjet ink, the compounding ratio of the Blue No. 1 was set to 1.1 mass %, the compounding ratio of the Yellow No. 4 was set to 1.6 mass %, the compounding ratio of the Red No. 102 was set to 1.5 mass %, the compounding ratio of the purified water was set to 41.7 mass %, the compounding ratio of the propylene glycol was set to 0.1 mass %, the compounding ratio of the ethanol was set to 50.0 mass %, and the compounding ratio of the reduced isomaltulose was set to 4.0 mass %. An inkjet ink of Comparative Example 1 was obtained in the same manner as in Example 1, except for the above.

Thus, the mass ratio between the reduced isomaltulose and the Blue No. 1 (Mass of reduced isomaltulose/Mass of Blue No. 1) in the inkjet ink of Comparative Example 1 was adjusted to 3.6.

Comparative Example 2

In this comparative example, based on the total inkjet ink, the compounding ratio of the Blue No. 1 was set to 1.1 mass %, the compounding ratio of the Yellow No. 4 was set to 1.6 mass %, the compounding ratio of the Red No. 102 was set to 1.5 mass %, the compounding ratio of the purified water was set to 60.9 mass %, the compounding ratio of the propylene glycol was set to 0.1 mass %, the compounding ratio of the ethanol was set to 30.0 mass %, and the compounding ratio of the reduced isomaltulose was set to 4.8 mass %. An inkjet ink of Comparative Example 2 was obtained in the same manner as in Example 1, except for the above.

Thus, the mass ratio between the reduced isomaltulose and the Blue No. 1 (Mass of reduced isomaltulose/Mass of Blue No. 1) in the inkjet ink of Comparative Example 2 was adjusted to 4.4.

Comparative Example 3

In this comparative example, based on the total inkjet ink, the compounding ratio of the Blue No. 1 was set to 0.7 mass %, the compounding ratio of the Yellow No. 4 was set to 0.3 mass %, the compounding ratio of the Red No. 102 was set to 1.0 mass %, the compounding ratio of the purified water was set to 42.4 mass %, the compounding ratio of the propylene glycol was set to 0.1 mass %, the compounding ratio of the ethanol was set to 40.0 mass %, and the compounding ratio of the reduced isomaltulose was set to 15.5 mass %. An inkjet ink of Comparative Example 3 was obtained in the same manner as in Example 1, except for the above.

Thus, the mass ratio between the reduced isomaltulose and the Blue No. 1 (Mass of reduced isomaltulose/Mass of Blue No. 1) in the inkjet ink of Comparative Example 3 was adjusted to 22.1.

Comparative Example 4

In this comparative example, based on the total inkjet ink, the compounding ratio of the Blue No. 1 was set to 0 mass % (i.e., not containing Blue No. 1), the compounding ratio of the Yellow No. 4 was set to 0 mass % (i.e., not containing Yellow No. 4), the compounding ratio of the Red No. 102 was set to 0.7 mass %, the compounding ratio of the purified water was set to 45.2 mass %, the compounding ratio of the propylene glycol was set to 0.1 mass %, the compounding ratio of the ethanol was set to 50.0 mass %, and the compounding ratio of the reduced isomaltulose was set to 4.0 mass %. An inkjet ink of Comparative Example 4 was obtained in the same manner as in Example 1, except for the above.

Thus, the mass ratio between the reduced isomaltulose and the Blue No. 1 (Mass of reduced isomaltulose/Mass of Blue No. 1) in the inkjet ink of Comparative Example 4 was adjusted to no solution (unmeasurable).

Comparative Example 5

In this comparative example, based on the total inkjet ink, the compounding ratio of the Blue No. 1 was set to 3.0 mass %, the compounding ratio of the Yellow No. 4 was set to 0.3 mass %, the compounding ratio of the Red No. 102 was set to 1.0 mass %, the compounding ratio of the purified water was set to 37.6 mass %, the compounding ratio of the propylene glycol was set to 0.1 mass %, the compounding ratio of the ethanol was set to 40.0 mass %, and the compounding ratio of the reduced isomaltulose was set to 18.0 mass %. An inkjet ink of Comparative Example 5 was obtained in the same manner as in Example 1, except for the above.

Thus, the mass ratio between the reduced isomaltulose and the Blue No. 1 (Mass of reduced isomaltulose/Mass of Blue No. 1) in the inkjet ink of Comparative Example 5 was adjusted to 6.0.

Comparative Example 6

In this comparative example, based on the total inkjet ink, the compounding ratio of the Blue No. 1 was set to 1.1 mass %, the compounding ratio of the Yellow No. 4 was set to 1.5 mass %, the compounding ratio of the Red No. 102 was set to 1.4 mass %, the compounding ratio of the purified water was set to 57.3 mass %, the compounding ratio of the propylene glycol was set to 0.1 mass %, the compounding ratio of the ethanol was set to 35.0 mass %, and the compounding ratio of the reduced isomaltulose was set to 3.6 mass %. An inkjet ink of Comparative Example 6 was obtained in the same manner as in Example 1, except for the above.

Thus, the mass ratio between the reduced isomaltulose and the Blue No. 1 (Mass of reduced isomaltulose/Mass of Blue No. 1) in the inkjet ink of Comparative Example 6 was adjusted to 3.3.

Each of the above-described inks of Examples 1 to 26 and Comparative Examples 1 to 6 was passed through a membrane filter to remove solid foreign matter in the liquid. Specifically, each of the inks was passed once through a membrane filter (cellulose acetate film) having a pore size of 5.0 μm, and subsequently, was passed once through a membrane filter (cellulose acetate film) having a pore size of 0.8 μm to give a purified ink.

<Evaluation>

The purified ink obtained by the ink of each of Examples and Comparative Examples described above was evaluated for the lightfastness and the intermittent resumability (printability) using the following methods. The evaluation results are shown in Tables 1 to 5 shown later together with the ink compositions of Examples and Comparative Examples described above.

(Lightfastness Test)

Using a piezoelectric ceramic-driven drop-on-demand inkjet head having a print resolution of 600 dpi in the main scanning direction and 600 dpi in the sub-scanning direction (conveyance direction of a recording medium, such as a tablet) and having 2, 656 nozzles in total, an image was printed on the following tablet using the purified inks of Examples 1 to 26 and Comparative Examples 1 to 6 at a printing drop quantity of 6 pl per drop. The purified inks of Examples 1 to 26 and Comparative Examples 1 to 6 described above were printed in a normal humidity environment (60% RH), and the lightfastness test was performed in a normal humidity environment (50% RH).

The tablet as the printing target was a film-coated tablet for test (Base: conditioned starch, Coating agent: mixture of 70% hydroxypropyl methylcellulose and 30% titanium oxide, Diameter: 6.5 mm). The printed image was a circular solid image (Diameter: 4.0 mm). Thus, film-coated tablet printed matter was obtained.

Using a xenon weather meter (Ci4000, Toyo Seiki Seisaku-sho, Ltd.), a cumulative 1.2 million lux of visible light was applied to the film-coated tablet printed matter of Examples and Comparative Examples of which the chromaticity and the optical color density were measured. During the lightfastness test period, the humidity in a test chamber was adjusted to 60% RH, and the humidity in a test machine was controlled such that the test machine was in a normal humidity environment (50% RH). The chromaticity and the optical color density were measured using a spectrophotometer for the film-coated tablet printed matter irradiated with the visible light, and a comparison was made between the color differences ΔE (according to JIS Z 8781) indicating the change in the chromaticity and the optical color density before and after the irradiation with the visible light. The comparison results are shown in Tables 1 to 5. As described above, with respect to the change in the color tone before and after the irradiation with the visible light, the present inventors derived the fact that, when the color difference ΔE according to JIS Z 8781 is 20 or less ($\Delta E \leq 20$), the photodiscoloration and/or photofading is sufficiently suppressed and the inkjet ink has excellent lightfastness. Thus, assuming that, when $\Delta E \leq 20$ was satisfied, the inkjet ink had excellent lightfastness, the inkjet ink was evaluated as "Pass" in this evaluation. Assuming that, when $\Delta E \leq 12$ was satisfied, the inkjet ink had extremely excellent lightfastness, the inkjet ink was regarded to be more excellent in this evaluation. "–" was added to samples for which the color difference ΔE was not able to be measured.

In Tables 1 to 5 below, the readability was also evaluated based on the value of the color difference ΔE. The evaluation criteria of the readability are as follows.

◎: ΔE≤12

○: 12<ΔE≤20 x: 20<ΔE (Intermittent Resumability Test)

Using a piezoelectric ceramic-driven drop-on-demand inkjet head having a print resolution of 600 dpi in the main scanning direction and 600 dpi in the sub-scanning direction (conveyance direction of the recording medium, such as a tablet) and having 2,656 nozzles in total, each inkjet ink was left to stand for a specified period of time (30 min) without flushing, a test pattern was printed using the inkjet ink at a printing drop quantity of 6 pl per drop, and it was confirmed that the inkjet ink was able to be discharged from all the nozzles without a discharge failure. In Tables 1 to 5 below, a standing time after which the ink was able to be discharged was measured as the intermittent printability evaluation result. The evaluation criteria are as follows. The purified inks of Examples 1 to 26 and Comparative Examples 1 to 6 above were printed at 60% RH, and subjected to the lightfastness test in a normal humidity environment (50% RH).

○: 30 min or more x: Less than 30 min

The compositions and the evaluation results of the inkjet inks of Examples and Comparative Examples are shown in Tables 1 to 5. In Tables 1 to 5, "–" portions indicate that the evaluation is impossible.

Table 1 shows changes in the evaluation results of the lightfastness and the printability when the mass ratio between the reduced isomaltulose and the Blue No. 1 (Mass of reduced isomaltulose/Mass of Blue No. 1) was changed.

Table 2 shows changes in the evaluation results of the lightfastness and the printability when the compounding ratio of the Blue No. 1 was changed.

Table 3 shows changes in the evaluation results of the lightfastness and the printability when the content ratio of the reduced isomaltulose was changed.

Table 4 shows changes in the evaluation results of the lightfastness and the printability when the compounding ratio of the ethanol was changed.

Table 5 shows changes in the evaluation results of the lightfastness and the printability when the compounding ratio of the propylene glycol was changed.

Each table has duplicate descriptions of Examples and Comparative Examples to show the changes in the evaluation results when the compounding ratio or the content ratio was changed.

TABLE 1

| | | | Serial numbers | Comp. Ex. 1 Sample 1 | Comp. Ex. 2 Sample 2 | Ex. 1 Sample 3 | Ex. 2 Sample 4 | Ex. 3 Sample 5 | Ex. 4 Sample 6 | Ex. 5 Sample 7 |
|---|---|---|---|---|---|---|---|---|---|---|
| Formula | Pigment | | Total amount | 4.2% | 4.2% | 2.6% | 2.6% | 2.6% | 2.6% | 4.2% |
| | | Dye | Blue No. 1 | 1.1% | 1.1% | 0.7% | 0.7% | 0.7% | 0.7% | 1.1% |
| | | | Yellow No. 4 | 1.6% | 1.6% | 1.0% | 1.0% | 1.0% | 1.0% | 1.6% |
| | | | Red No. 102 | 1.5% | 1.5% | 0.9% | 0.9% | 0.9% | 0.9% | 1.5% |
| | Purified water | | | 41.7% | 60.9% | 63.3% | 62.5% | 62.2% | 61.7% | 55.7% |
| | Drying accelerator | | Ethanol | 50.0% | 30.0% | 30.0% | 30.0% | 30.0% | 30.0% | 30.0% |
| | | | IPA (2-propanol) | | | | | | | |
| | Wetting agent | | Propylene glycol | 0.1% | 0.1% | 0.1% | 0.1% | 0.1% | 0.1% | 0.1% |
| | Additive | | Reduced isomaltulose | 4.0% | 4.8% | 4.0% | 4.8% | 5.1% | 5.6% | 10.0% |
| Reduced isomaltulose/Blue No. 1 | | | | 3.6 | 4.4 | 5.7 | 6.9 | 7.3 | 8.0 | 9.1 |
| Performance evaluation | Lightfastness | | ΔE | 35.7 | 32.1 | 19.6 | 14.3 | 12.0 | 11.2 | 7.2 |
| | | | Readability (20 ≥ ○, 12 ≥ ◎) | X | X | ○ | ○ | ◎ | ◎ | ◎ |
| | Printability | | | ○ | ○ | ○ | ○ | ○ | ○ | ○ |

| | | | Serial numbers | Ex. 6 Sample 8 | Ex. 7 Sample 9 | Ex 8 Sample 10 | Comp. Ex 3 Sample 11 | Ex. 9 Sample 12 | Ex. 10 Sample 13 | Ex. 11 Sample 14 |
|---|---|---|---|---|---|---|---|---|---|---|
| Formula | Pigment | | Total amount | 2.6% | 1.8% | 1.8% | 2.0% | 2.6% | 2.6% | 2.6% |
| | | Dye | Blue No. 1 | 0.7% | 0.5% | 0.5% | 0.7% | 0.7% | 0.7% | 0.7% |
| | | | Yellow No. 4 | 1.0% | 0.3% | 0.3% | 0.3% | 1.0% | 1.0% | 1.0% |
| | | | Red No. 102 | 0.9% | 1.0% | 1.0% | 1.0% | 0.9% | 0.9% | 0.9% |
| | Purified water | | | 60.9% | 50.2% | 50.0% | 42.4% | 60.9% | 30.9% | 61.0% |
| | Drying accelerator | | Ethanol | 30.0% | 40.0% | 40.0% | 40.0% | | | |
| | | | IPA (2-propanol) | | | | | 30.0% | 60.0% | 30.0% |
| | Wetting agent | | Propylene glycol | 0.1% | 0.1% | 0.1% | 0.1% | 0.1% | 0.1% | |
| | Additive | | Reduced isomaltulose | 6.4% | 7.9% | 8.1% | 15.5% | 6.4% | 6.4% | 6.4% |
| Reduced isomaltulose/Blue No. 1 | | | | 9.1 | 15.8 | 16.2 | 22.1 | 9.1 | 9.1 | 9.1 |
| Performance evaluation | Lightfastness | | ΔE | 10.4 | 10.9 | 10.1 | — | 11.4 | 19.4 | 11.8 |
| | | | Readability (20 ≥ ○, 12 ≥ ◎) | ◎ | ◎ | ◎ | — | ◎ | ○ | ◎ |
| | Printability | | | ○ | ○ | ○ | X | ○ | ○ | ○ |

TABLE 2

| | | Serial numbers | Comp. Ex. 4 Sample 15 | Ex. 12 Sample 16 | Ex. 13 Sample 17 | Ex. 14 Sample 18 | Ex. 7 Sample 9 | Ex. 15 Sample 19 | Ex. 4 Sample 6 |
|---|---|---|---|---|---|---|---|---|---|
| Formula | Pigment | Total amount | 0.7% | 1.4% | 1.5% | 1.6% | 1.0% | 2.1% | 2.6% |
| | Dye | Blue No. 1 | 0.0% | 0.1% | 0.2% | 0.3% | 0.5% | 0.6% | 0.7% |
| | | Yellow No. 4 | 0.0% | 0.3% | 0.3% | 0.3% | 0.3% | 0.8% | 1.0% |
| | | Red No. 102 | 0.7% | 1.0% | 1.0% | 1.0% | 1.0% | 0.7% | 0.9% |
| | Purified water | | 45.2% | 56.9% | 55.3% | 53.6% | 50.2% | 43.8% | 61.7% |
| | Drying accelerator | Ethanol | 50.0% | 40.0% | 40.0% | 40.0% | 40.0% | 50.0% | 30.0% |
| | Wetting agent | Propylene glycol | 0.1% | 0.1% | 0.1% | 0.1% | 0.1% | 0.1% | 0.1% |
| | Additive | Reduced isomaltulose | 4.0% | 1.6% | 3.1% | 4.7% | 7.9% | 4.0% | 5.6% |
| | Reduced isomaltulose/Blue No. 1 | | — | 16.0 | 15.5 | 15.7% | 15.8 | 6.7 | 8.0 |
| Performance evaluation | Lightfastness | ΔE | 28.0 | 18.4 | 11.8 | 11.3% | 10.9 | 18.1 | 11.2 |
| | | Readability (20 ≥ ○, 12 ≥ ◎) | X | ○ | ◎ | ◎ | ◎ | ○ | ◎ |
| | Printability | | ○ | ○ | ○ | ○ | ○ | ○ | ○ |

| | | Serial numbers | Ex. 5 Sample 7 | Ex. 16 Sample 20 | Ex. 17 Sample 21 | Ex. 18 Sample 22 | Ex. 19 Sample 23 | Comp. Ex. 5 Sample 24 |
|---|---|---|---|---|---|---|---|---|
| Formula | Pigment | Total amount | 4.2% | 4.5% | 1.5% | 3.4% | 3.8% | 4.3% |
| | Dye | Blue No. 1 | 1.1% | 1.4% | 1.5% | 2.1% | 2.5% | 3.0% |
| | | Yellow No. 4 | 1.6% | 1.6% | 0.0% | 0.3% | 0.3% | 0.3% |
| | | Red No. 102 | 1.5% | 1.5% | 0.0% | 1.0% | 1.0% | 1.0% |
| | Purified water | | 55.7% | 53.4% | 45.4% | 41.5% | 41.1% | 37.6% |
| | Drying accelerator | Ethanol | 30.0% | 30.0% | 40.0% | 40.0% | 40.0% | 40.0% |
| | Wetting agent | Propylene glycol | 0.1% | 0.1% | 0.1% | 0.1% | 0.1% | 0.1% |
| | Additive | Reduced isomaltulose | 10.0% | 12.0% | 13.0% | 15.0% | 15.0% | 18.0% |
| | Reduced isomaltulose/Blue No. 1 | | 9.1 | 8.6 | 8.7 | 7.1 | 6.0 | 6.0 |
| Performance evaluation | Lightfastness | ΔE | 7.2 | 11.1 | 18.0 | 16.2 | 15.5 | — |
| | | Readability (20 ≥ ○, 12 ≥ ◎) | ◎ | ◎ | ○ | ○ | ○ | — |
| | Printability | | ○ | ○ | ○ | ○ | ○ | X |

TABLE 3

| | | Serial numbers | Comp. Ex. 6 Sample 25 | Ex. 15 Sample 19 | Ex. 3 Sample 5 | Ex. 4 Sample 6 | Ex. 6 Sample 8 | Ex. 5 Sample 7 | Ex. 17 Sample 21 | Ex. 18 Sample 22 | Comp. Ex. 3 Sample 11 |
|---|---|---|---|---|---|---|---|---|---|---|---|
| Formula | Pigment | Total amount | 4.0% | 2.1% | 2.6% | 2.6% | 2.6% | 4.2% | 1.5% | 3.4% | 2.0% |
| | Dye | Blue No. 1 | 1.1% | 0.6% | 0.7% | 0.7% | 0.7% | 1.1% | 1.5% | 2.1% | 0.7% |
| | | Yellow No. 4 | 1.5% | 0.8% | 1.0% | 1.0% | 1.0% | 1.6% | 0.0% | 0.3% | 0.3% |
| | | Red No. 102 | 1.4% | 0.7% | 0.9% | 0.9% | 0.9% | 1.5% | 0.0% | 1.0% | 1.0% |
| | Purified water | | 57.3% | 43.8% | 62.2% | 61.7% | 60.9% | 55.7% | 45.4% | 41.5% | 42.4% |
| | Drying accelerator | Ethanol | 35.0% | 50.0% | 30.0% | 30.0% | 30.0% | 30.0% | 40.0% | 40.0% | 40.0% |
| | Wetting agent | Propylene glycol | 0.1% | 0.1% | 0.1% | 0.1% | 0.1% | 0.1% | 0.1% | 0.1% | 0.1% |
| | Additive | Reduced isomaltulose | 3.6% | 4.0% | 5.1% | 5.6% | 6.4% | 10.0% | 13.0% | 15.0% | 15.5% |
| | Reduced isomaltulose/Blue No. 1 | | 3.3 | 6.7 | 7.3 | 8.0 | 9.1 | 9.1 | 8.7 | 7.1 | 22.1 |
| Performance evaluation | Lightfastness | ΔE | 35.0 | 18.1 | 12.0 | 11.2 | 10.4 | 7.2 | 18.0 | 16.2 | — |
| | | Readability (20 ≥ ○, 12 ≥ ◎) | X | ○ | ◎ | ◎ | ◎ | ◎ | ○ | ○ | — |
| | Printability | | ○ | ○ | ○ | ○ | ○ | ○ | ○ | ○ | X |

TABLE 4

| | | Serial numbers | Ex. 4 Sample 6 | Ex. 20 Sample 26 | Ex. 15 Sample 19 | Ex. 21 Sample 27 |
|---|---|---|---|---|---|---|
| Formula | Pigment | Total amount | 2.6% | 2.6% | 2.1% | 2.1% |
| | Dye | Blue No. 1 | 0.7% | 0.7% | 0.6% | 0.6% |
| | | Yellow No. 4 | 0.1% | 0.1% | 0.8% | 0.8% |
| | | Red No. 102 | 0.9% | 0.9% | 0.7% | 0.7% |
| | Purified water | | 61.7% | 51.7% | 43.8% | 33.8% |
| | Drying accelerator | Ethanol | 30.0% | 40.0% | 50.0% | 60.0% |

TABLE 4-continued

| | | Serial numbers | Ex. 4 Sample 6 | Ex. 20 Sample 26 | Ex. 15 Sample 19 | Ex. 21 Sample 27 |
|---|---|---|---|---|---|---|
| | Wetting agent | Propylene glycol | 0.1% | 0.1% | 0.1% | 0.1% |
| | Additive | Reduced isomaltulose | 5.6% | 5.6% | 4.0% | 4.0% |
| | Reduced isomaltulose/Blue No. 1 | | 8.0 | 8.0 | 6.7 | 6.7 |
| Performance evaluation | Lightfastness | ΔE | 11.2 | 12.0 | 18.1 | 18.5 |
| | | Readability (20 ≥ ○, 12 ≥ ◎) | ◎ | ◎ | ○ | ○ |
| | Printability | | ○ | ○ | ○ | ○ |

TABLE 5

| | | | Serial numbers | Ex. 22 Sample 26 | Ex. 4 Sample 6 | Ex. 23 Sample 29 | Ex. 24 Sample 30 | Ex. 25 Sample 31 | Ex. 26 Sample 32 |
|---|---|---|---|---|---|---|---|---|---|
| Formula | Pigment | | Total amount | 2.6% | 2.6% | 2.6% | 2.6% | 2.6% | 2.6% |
| | | Dye | Blue No. 1 | 0.7% | 0.7% | 0.7% | 0.7% | 0.7% | 0.7% |
| | | | Yellow No. 4 | 1.0% | 1.0% | 1.0% | 1.0% | 1.0% | 1.0% |
| | | | Red No. 102 | 0.9% | 0.9% | 0.9% | 0.9% | 0.9% | 0.9% |
| | Purified water | | | 61.8% | 61.7% | 61.3% | 60.8% | 60.3% | 59.8% |
| | Drying accelerator | | Ethanol | 30.0% | 30.0% | 30.0% | 30.0% | 30.0% | 30.0% |
| | Wetting agent | | Propylene glycol | 0.0% | 0.1% | 0.5% | 1.0% | 1.5% | 2.0% |
| | Additive | | Reduced isomaltulose | 5.6% | 5.6% | 5.6% | 5.6% | 5.6% | 5.6% |
| | Reduced isomaltulose/Blue No. 1 | | | 8.0 | 8.0 | 8.0 | 8.0 | 8.0 | 8.0 |
| Performance evaluation | Lightfastness | | ΔE | 11.0 | 11.2 | 10.7 | 11.6 | 11.1 | 11.8 |
| | | | Readability (20 ≥ ○, 12 ≥ ◎) | ◎ | ◎ | ◎ | ◎ | ◎ | ◎ |
| | Printability | | | ○ | ○ | ○ | ○ | ○ | ○ |

As shown in Tables 1 to 5, the color differences ΔE before and after the irradiation with the visible light in the film-coated tablet printed matter of Examples 1 to 26 all were 20 or less (ΔE≤20) as a result of the lightfastness test. Specifically, the color differences ΔE before and after the irradiation with the visible light in the film-coated tablet printed matter of Examples 1 to 26 were in the range of 7.2 to 19.6, and all were less than 20. More specifically, the inkjet inks of Example 1 to 26 were found to all sufficiently suppress the photodiscoloration and/or photofading of the printed images and be imparted with excellent lightfastness even in a normal humidity environment (50% RH). In contrast thereto, the color differences ΔE before and after the irradiation with the visible light in the film-coated tablet printed matter of Comparative Examples 1 to 6 all had values exceeding 20 (ΔE>20) as a result of the lightfastness test as shown in Tables 1 to 5. More specifically, the inkjet inks of Comparative Examples 1 to 6 were found to be not able to sufficiently suppress the photodiscoloration and/or photofading of the printed images and be insufficient in lightfastness when the inkjet inks were stored and used in a normal humidity environment (50% RH)

The results of the lightfastness test described above showed that the inkjet ink containing the Blue No. 1 as the food dye in the range of 0.1 mass % or more and 2.5 mass % or less based on the total mass of the inkjet ink and the reduced isomaltulose as the fixing agent in the range of 5.7 times or more and 16.2 times or less the mass of the Blue No. 1 can sufficiently suppress the photodiscoloration and/or photofading of the printed images and is imparted with excellent lightfastness even when the inkjet ink was stored and used in a normal humidity environment (50% RH).

Further, the inkjet inks of Example 1 to 26 were found to all have the evaluation results of the intermittent resumability of "o" and have good lightfastness and sufficient intermittent resumability even when the inkjet inks of Example 1 to 26 were stored and used in a normal humidity environment (50% RH) as shown in Tables 1 to 5.

Further, the present invention can take the following compositions, for example.

(1) An inkjet ink containing: Blue No. 1 as a food dye in the range of 0.1 mass % or more and 2.5 mass % or less based on the total mass of the inkjet ink; and reduced isomaltulose as a fixing agent in the range of 5.7 times or more and 16.2 times or less the mass of the Blue No. 1.

(2) The inkjet ink according to (1) above, in which the compounding ratio of the reduced isomaltulose is in the range of 4.0 mass % or more and 15.0 mass % or less based on the total mass of the inkjet ink.

(3) The inkjet ink according to (1) or (2) above containing: water and PG or ethanol as a solvent.

(4) The inkjet ink according to (1) or (2) above containing: at least water, PG, and ethanol as the solvent.

(5) The inkjet ink according to (1) or (2) above containing: only three types of solvents: water, PG, and ethanol.

(6) The inkjet ink according to any one of (1) to (5) above containing: Blue No. 1 as the food dye in the range of 0.5 mass % or more and 0.7 mass % or less based on the total mass of the inkjet ink.

(7) The inkjet ink according to any one of (1) to (6) above containing: Yellow No. 4 as the food dye in the range of 0.3 mass % or more and 1.0 mass % or less based on the total mass of the inkjet ink.

(8) The inkjet ink according to any one of (1) to (7) above containing: Red No. 102 as the food dye in the range of 0.9 mass % or more and 1.0 mass % or less based on the total mass of the inkjet ink.

(9) The inkjet ink according to any one of (1) to (5) above containing: as the food dye, Blue No. 1 in the range of 0.5 mass % or more and 0.7 mass % or less based on the total mass of the inkjet ink, Yellow No. 4 in the range of 0.3 mass % or more and 1.0 mass % or less based on the total mass of the inkjet ink, and Red No. 102 in the range of 0.9 mass % or more and 1.0 mass % based on the total mass of the inkjet ink.

(10) The inkjet ink according to (9) above containing: the food dye including the Blue No. 1, the Yellow No. 4, and the Red No. 102 in the range of 1.8 mass % or more and 2.6 mass % or less based on the total mass of the inkjet ink.

(11) The inkjet ink according to according to any one of (1) to (10) above containing: water as the solvent in the range of 50.2 mass % or more and 60.9 mass % or less based on the total mass of the inkjet ink.

(12) The inkjet ink according to according to any one of (1) to (11) above containing: ethanol as the solvent in the range of 30.0 mass % or more and 40.0 mass % or less based on the total mass of the inkjet ink.

(13) The inkjet ink according to any one of (1) to (12) above, in which the compounding ratio of the reduced isomaltulose is in the range of 5.6 mass % or more and 7.9 mass % or less based on the total mass of the inkjet ink.

(14) The inkjet ink according to according to any one of (1) to (10) above containing: as the solvent, water in the range of 50.2 mass % or more and 60.9 mass % or less based on the total mass of the inkjet ink, ethanol in the range of 30.0 mass % or more and 40.0 mass % or less based on the total mass of the inkjet ink, and PG in the proportion of 0.1 mass % based on the total mass of the inkjet ink.

(15) A tablet printed matter including: a printed part printed with the inkjet ink according to any one of (1) to (14) above.

The scope of the present invention is not limited to the illustrated and described exemplary embodiments, and also encompasses all the embodiments that achieve effects equivalent to the intended effects of the present invention. Further, the scope of the present invention is not limited to combinations of the features of the invention defined by claims, and can be defined by any desired combinations of specific features among all the disclosed features.

REFERENCE SIGNS LIST

1 substrate of tablet
3 printed image
5 uncoated tablet printed matter
7 film coating layer
9 film-coated tablet printed matter
11 uncoated tablet printed image (solid image)
13 film-coated tablet printed image (two-dimensional barcode)

The invention claimed is:

1. An inkjet ink comprising:
Blue No. 1 as a food dye in a range of 0.1 mass % or more and 2.5 mass % or less based on a total mass of the inkjet ink; and
reduced isomaltulose as a fixing agent in a range of 5.7 times or more and 16.2 times or less a mass of the Blue No. 1.

2. The inkjet ink according to claim 1, wherein a compounding ratio of the reduced isomaltulose is in a range of 4.0 mass % or more and 15.0 mass % or less based on the total mass of the inkjet ink.

3. The inkjet ink according to claim 1 comprising:
water and PG or ethanol as a solvent.

4. The inkjet ink according to claim 1 comprising at least:
water, PG, and ethanol as the solvent.

5. The inkjet ink according to claim 1 comprising:
only three types of solvents: water, PG, and ethanol.

6. The inkjet ink according to claim 1 comprising:
Blue No. 1 as the food dye in a range of 0.5 mass % or more and 0.7 mass % or less based on the total mass of the inkjet ink.

7. The inkjet ink according to claim 1 comprising:
Yellow No. 4 as the food dye in a range of 0.3 mass % or more and 1.0 mass % or less based on the total mass of the inkjet ink.

8. The inkjet ink according to claim 1 comprising:
Red No. 102 as the food dye in a range of 0.9 mass % or more and 1.0 mass % or less based on the total mass of the inkjet ink.

9. The inkjet ink according to claim 1 comprising:
as the food dye, Blue No. 1 in a range of 0.5 mass % or more and 0.7 mass % or less based on the total mass of the inkjet ink, Yellow No. 4 in a range of 0.3 mass % or more and 1.0 mass % or less based on the total mass of the inkjet ink, and Red No. 102 in a range of 0.9 mass % or more and 1.0 mass % based on the total mass of the inkjet ink.

10. The inkjet ink according to claim 9 comprising:
the food dye including the Blue No. 1, the Yellow No. 4, and the Red No. 102 in a range of 1.8 mass % or more and 2.6 mass % or less based on the total mass of the inkjet ink.

11. The inkjet ink according to according to claim 1 comprising:
water as the solvent in a range of 50.2 mass % or more and 60.9 mass % or less based on the total mass of the inkjet ink.

12. The inkjet ink according to according to claim 1 comprising:
ethanol as the solvent in a range of 30.0 mass % or more and 40.0 mass % or less based on the total mass of the inkjet ink.

13. The inkjet ink according to claim 1, wherein a compounding ratio of the reduced isomaltulose is in a range of 5.6 mass % or more and 7.9 mass % or less based on the total mass of the inkjet ink.

14. The inkjet ink according to claim 10 comprising:
as the solvent, water in a range of 50.2 mass % or more and 60.9 mass % or less based on the total mass of the inkjet ink, ethanol in a range of 30.0 mass % or more and 40.0 mass % or less based on the total mass of the inkjet ink, and PG in a proportion of 0.1 mass % based on the total mass of the inkjet ink.

15. A tablet printed matter comprising:
a printed part printed with the inkjet ink according to claim 1.

16. A tablet printed matter comprising:
a printed part printed with the inkjet ink according to claim 2.

17. A tablet printed matter comprising:
a printed part printed with the inkjet ink according to claim 3.

18. A tablet printed matter comprising:

a printed part printed with the inkjet ink according to claim 4.

19. A tablet printed matter comprising:

a printed part printed with the inkjet ink according to claim 5.

20. A tablet printed matter comprising:

a printed part printed with the inkjet ink according to claim 6.

* * * * *